(12) United States Patent
Kasahara et al.

(10) Patent No.: US 6,339,529 B1
(45) Date of Patent: Jan. 15, 2002

(54) ELECTRIC DOUBLE LAYER CAPACITOR AND METHOD OF FORMING THE SAME

(75) Inventors: Ryuichi Kasahara; Takashi Saito; Yukari Kibi, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/598,609

(22) Filed: Jun. 21, 2000

(30) Foreign Application Priority Data

Jun. 21, 1999 (JP) .......................................... 11-173520

(51) Int. Cl.[7] .................................................. H01G 9/00
(52) U.S. Cl. ........................ 361/502; 361/503; 361/508; 361/509; 361/516
(58) Field of Search ................................. 361/502, 503, 361/504, 508, 509, 576, 433, 525, 528

(56) References Cited

U.S. PATENT DOCUMENTS

| | | | |
|---|---|---|---|
| 3,652,902 A | 3/1972 | Hart et al. ................... | 317/230 |
| 4,783,723 A | 11/1988 | Watanabe et al. ........... | 361/433 |
| 5,072,335 A | 12/1991 | Kurabayashi et al. ....... | 361/502 |
| 5,450,279 A | 9/1995 | Yoshida et al. ............. | 361/502 |
| 6,005,765 A | 12/1999 | Maeda et al. ............... | 361/502 |

FOREIGN PATENT DOCUMENTS

| | | | |
|---|---|---|---|
| JP | 3283518 | * | 12/1991 |
| JP | 422062 | * | 1/1992 |
| JP | 574658 | * | 3/1993 |
| JP | 5326326 | * | 12/1993 |
| JP | 724253 | * | 3/1995 |
| JP | 786096 | * | 3/1995 |
| JP | 786098 | * | 3/1995 |
| JP | 735379 | * | 8/1995 |
| JP | 9148202 | * | 6/1997 |

* cited by examiner

Primary Examiner—Dean A. Reichard
Assistant Examiner—Nguyen Ha
(74) Attorney, Agent, or Firm—Young & Thompson

(57) ABSTRACT

A unitary-formed electrode structure serving as both a collector and a polarization electrode includes an electrically conductive base serving as the collector, and a polarization electrode that includes a multiplicity of separate polarization particles dispersed throughout the base and exposed in at least a part of a surface of the base.

21 Claims, 13 Drawing Sheets

♦: discharge at 2.5mA/cm2.
◇: discharge at 250mA/cm2.

◆: example 7

◇: comparative example 3

ELECTRIC DOUBLE LAYER CAPACITOR AND METHOD OF FORMING THE SAME

BACKGROUND OF THE INVENTION

The present invention relates to an electric double layer capacitor and a method of forming the same, and more particularly to an improvement in structure of a collector and a polarization electrode of an electric double layer capacitor which has a large capacity for various purposes, for example, of a semiconductor memory back-up.

FIG. 1 is a schematic cross sectional elevation view illustrative of a structure of a basic cell or a capacitor element of a conventional electric double layer capacitor. A pair of polarization electrodes 10 is provided. A separator 12 is also provided which separates the paired polarization electrodes 10. A pair of collectors 11 is provided, so that the paired collectors 11 sandwich the paired polarization electrodes 10. The sandwiched structure comprising the paired polarization electrodes 10 and the separator 12 has opposite ends which are spaced apart from each other in a direction parallel to interfaces between the separator 12 and the paired polarization electrodes 10. The opposite ends of the sandwiched structure are sealed with a gasket 13. Each of the paired polarization electrodes 10 is permeated with an electrolyte to form an electric double layer structure. Further, a pair of terminal plates 14 is provided, wherein the paired terminal plates 14 are in contact with the paired collectors. 11.

It is necessary that the polarization electrodes 10 are electrically conductive and stable to the used electrolyte as well as have a large surface area. Powders or fibers of activated carbons such as coconut shell based activated carbon, or one of those activated carbons solidified by a binder such as polyetrafluoroethylene are available for material of the polarization electrodes 10. The polarization electrodes 10 are permeated with an electrolyte therein. An available electrolyte of solution type is, for example, a sulfuric acid and potassium hydroxide. An available electrolyte of organic solvent type is, for example, quaternary ammonium salt. If the solution type electrolyte is used, then the collector 11 may be made of an organic material such as a rubber provided with a conductivity, for example, carbon powders. If the organic solvent type electrolyte is used, then the collector 11 may comprise a metal film. In order to reduce an internal resistance of the polarization electrodes 10 themselves and also reduce sa contact resistance between the polarization electrode 10 and the collector 11, a thermal fusion splicing between the polarization electrode 10 and the collector 11 is carried out so that projections on a surface of the polarization electrode 10 partially enter into the surface of the collector 11, if the collector 11 may be made of the organic material such as the rubber with the conductive powders. The separator 12 comprises a porous membrane with an ion-permeability but without electrical conductivity, for example, a polypropylene porous membrane. The gasket 13 may comprise an insulation rubber for maintaining a shape of the basic cell and preventing any leakage of the electrolyte as well as preventing a short circuit due to contact of the collectors 11 to a case. The terminal plates 14 are pressured toward the collectors 11 so as to reduce a contact resistance between the terminal plates 14 and the collectors 11.

A withstand voltage of the basic cell depends upon the kind of the electrolyte. If, for example, the solution type electrolyte is used, then the withstand voltage is about 1.0V. If the organic solvent type electrolyte is used, then the withstand voltage is in the range of about 2.0 V to 3.0V. Therefore, in order to obtain the required withstand voltage, a plurality of the basic cells are laminated in series connection.

In the past, the electric double layer capacitor has been used for the purpose of applying a relatively small current, such as a back-up of a memory. In recent years, however, the electric double layer capacitor has been used for not only the above purpose but also another purpose of applying a large current in other fields of automobile, and electronic components which need relatively large currents. In order to apply a relatively large current, it is important to reduce the thicknesses of the polarization electrode and the collector so as to reduce an equivalent series resistance (ESR) of the basic cell. Upon the requirement for size-down of the electronic component, it is also required to reduce the thickness of the electric double layer capacitor.

The conventional electric double layer capacitor has the following problems. The surface roughness of the collector and the polarization electrode makes it difficult to obtain tight contacts between the collector and the polarization and between the collector and the terminal plate. Loose contacts between the collector and the polarization and between the collector and the terminal plate result in large contact resistances between them. In order to reduce the contact resistance, it is necessary that the basic cell is pressured from opposite sides to the center so as to obtain the required tight contacts between them. Time-passing makes the contacts between them loose whereby the contact resistances and the equivalent series resistance increase. Further, a long-time use of the electric double layer capacitor under conditions of a high temperature and a high voltage load, a gas is likely to be generated in the interior of the capacitor whereby the polarization electrodes are peeled to increase the internal resistance.

It has been known that in order to reduce the contact resistance between the polarization electrode and the collector, the polarization electrode and the collector are bonded with each other by a conductive adhesive. In Japanese laid-open patent publication No. 3-28318, it is disclosed that a conductive adhesive material is applied on the collector and a polarization electrode is made into tightly contact with the conductive adhesive material applied on the collector by a heat press. In Japanese laid-open patent publication No. 7-86098, it is disclosed that a solution dispersed with an activated carbon is put into a collector in the shape of a container to cause carbonization to form a polarization electrode, before the collector and the polarization electrode are bonded with each other by a conductive adhesive. In Japanese laid-open patent publication No. 9-148202, it is disclosed that a polyvinylidene chloride resin melt with a solvent is applied on the collector before a polarization electrode is placed on the polyvinylidene chloride resin applied on the collector, and then the polarization electrode is pressured toward the collector to heat up the same but at a temperature lower than a carbonization temperature whereby the polarization electrode and the collector are bonded with each other.

The above conventional methods by using the conductive adhesive are effective to reduce the contact resistance between the polarization electrode and the collector. Since, however, the conductive adhesive is not so low in the resistance, then it is difficult to considerably reduce the internal resistance of the electric double layer capacitor.

In Japanese laid-open patent publication No. 5-326326, it is disclosed that activated carbon is used for the polarization electrode whilst graphite powders are used for the collector, but the polarization electrode and the collector are formed or by sintering process in a single member which comprises two compositions, for example, activated carbon and graphite but which is compositionally graded so that, from one side to opposite side, a first compositional ratio of activated carbon is decreased from 100% to 0% continuously or discontinuously, whilst a second compositional ratio of graphite is increased from 0% to 100% continuously or discontinuously.

The above later conventional method is effective to reduce the internal resistance of the electric double layer capacitor. The electrode is, however, poor in softness such as rubber material. Also the polarization electrode part is brittle and breakable. Further, it is hard to adhere the collector to the gasket.

In the above circumstances, it had been required to develop a novel electric double layer capacitor free from the above problem.

SUMMARY OF THE INVENTION

Accordingly, it is an object of the present invention to provide a novel electric double layer capacitor free from the above problems.

It is a further object of the present invention to provide a novel electric double layer capacitor having thickness-reduced polarization electrode and collector.

it is a still further object of the present invention to provide a novel electric double layer capacitor having a reduced contact resistance.

It is yet a further object of the present invention to provide a novel electric double layer capacitor having a reduced equivalent series resistance.

It is another object of the present invention to provide a novel electric double layer capacitor which is highly reliable.

It is yet another object of the present invention to provide a novel electric double layer capacitor which has a long durability.

Also, it is another object of the present invention to provide a novel structure of polarization electrodes and collectors in an electric double layer capacitor free from the above problems.

It is a further object of the present invention to provide a novel structure of polarization electrodes and collectors in an electric double layer capacitor having thickness-reduced polarization electrode and collector.

It is a still further object of the present invention to provide a novel structure of polarization electrodes and collectors in an electric double layer capacitor having a reduced contact resistance.

It is yet a further object of the present invention to provide a novel structure of polarization electrodes and collectors in an electric double layer capacitor having a reduced equivalent series resistance.

It is another object of the present invention to provide a novel structure of polarization electrodes and collectors in an electric double layer capacitor which is highly reliable.

It is yet another object of the present invention to provide a novel structure of polarization electrodes and collectors in an electric double layer capacitor which has a long durability.

Also, it is another object of the present invention to provide a novel method of forming an electric double layer capacitor free from the above problems.

It is a further object of the present invention to provide a novel method of forming an electric double layer capacitor having thickness-reduced polarization electrode and collector.

It is a still further object of the present invention to provide a novel method of forming an electric double layer capacitor having a reduced contact resistance.

It is yet a further object of the present invention to provide a novel method of forming an electric double layer capacitor having a reduced equivalent series resistance.

It is another object of the present invention to provide a novel method of forming an electric double layer capacitor which is highly reliable.

It is yet another object of the present invention to provide a novel method of forming an electric double layer capacitor which has a long durability.

The present invention provides a unitary-formed electrode structure serving as both a collector and a polarization electrode. The structure comprises: a base material having an electrical conductivity for serving as the collector; and a polarization electrode material existing in at least a part of a surface region of the base material, so that at least the polarization electrode material is partially shown on the surface region of the base material.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DESCRIPTION OF THE PREFERRED EMBODIMENTS

Figure 1:
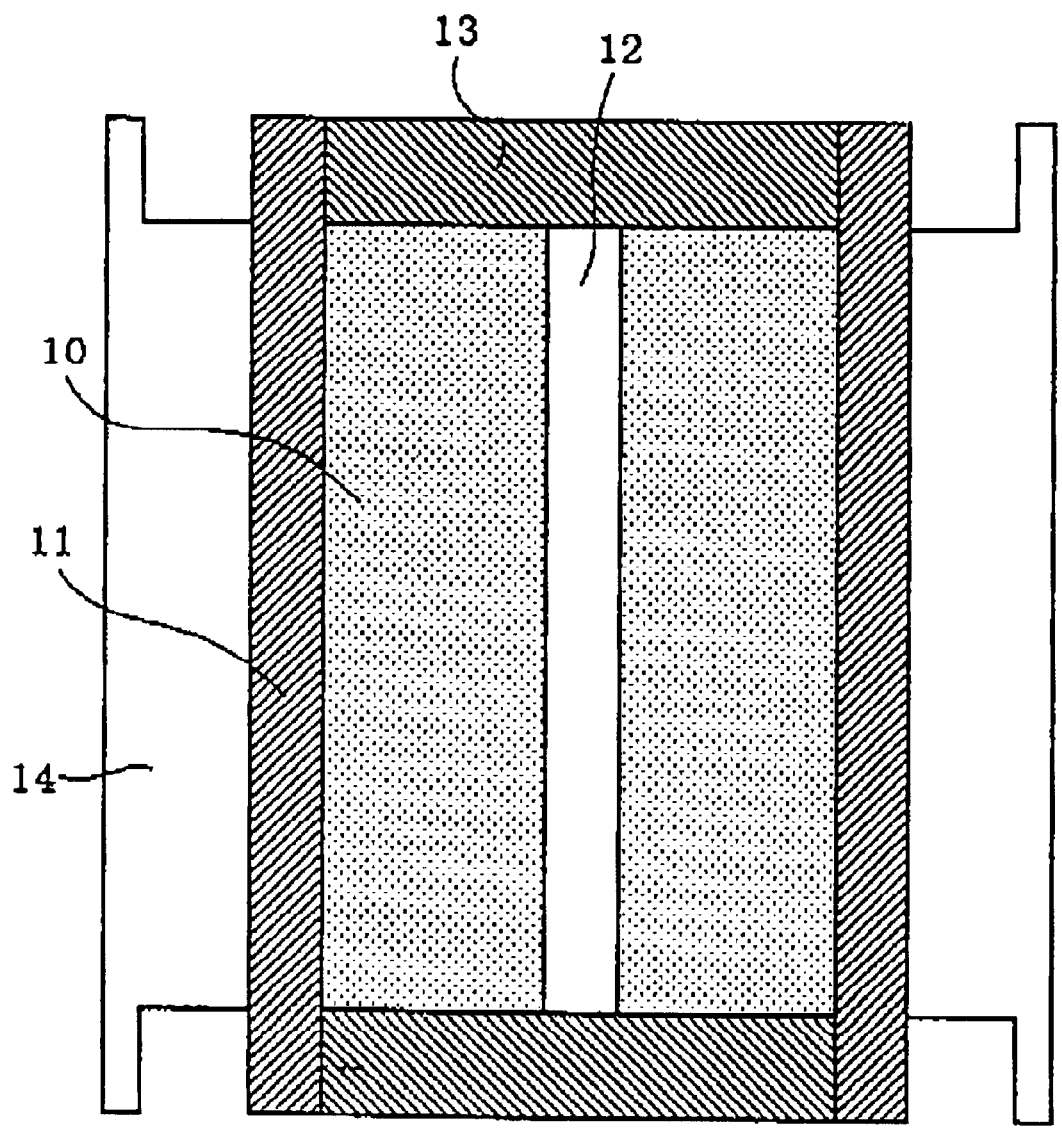
FIG. 1 is a schematic cross sectional elevation view illustrative of a structure of a basic cell or a capacitor element of a conventional electric double layer capacitor.

The first aspect of the present invention provides a unitary-formed electrode structure serving as both a collector and a polarization electrode. The structure comprises: a base material having an electrical conductivity for serving as the collector; and a polarization electrode material existing in at least a part of a surface region of the base material, so that at least the polarization electrode material is partially shown on the surface region of the base material.

It is preferable that the polarization electrode material comprises conductive powders distributed and mixed in the base material, provided that parts of the conductive powders are shown on the surface region of the base material.

It is further preferable that the conductive powders are included in the range of 30–80% by weight.

It is further more preferable that the conductive powders are included in the range of 40–70% by weight.

It is also preferable that the polarization electrode material comprises conductive particles distributed and mixed in the base material, provided that parts of the conductive powders are shown on the surface region of the base material.

It is also preferable that the conductive particles are included in the range of 30–80% by weight.

It is further preferable that the conductive particles are included in the range of 40–70% by weight.

It is also preferable that the base material electrically conductive comprises an electrically insulative base material which is mixed with a conductive material.

It is further preferable that the conductive material is included in the range of 5–30% by weight.

It is preferable that the electrically insulative base material comprises one selected from the group consisting of a butyl rubber, a polybutadiene rubber, a polyisoprene rubber, a butadiene styrene rubber (SBR), an ethylene propylene rubber (EPM), ethylene-α-olefin copolymer and propylene-α-olefin copolymer.

It is also preferable that the electrically insulative base material comprises a sheet-shaped base member.

The second aspect of the present invention provides an electric double layer capacitor comprises: at least a pair of unitary-formed electrode structures which are separated by a separator, and each of the paired unitary-formed electrode structures serving as both a collector and a polarization electrode, wherein each of the unitary-formed electrode structures further comprises: a base material having an electrical conductivity for serving as the collector; and a polarization electrode material existing in at least a part of a surface region of the base material, so that at least the polarization electrode material is partially shown on the surface region of the base material.

It is preferable that the polarization electrode material comprises conductive powders distributed and mixed in the base material, provided that parts of the conductive powders are shown on the surface region of the base material.

It is further preferable that the conductive powders are included in the range of 30–80% by weight.

It is further more preferable that the conductive powders are included in the range of 40–70% by weight.

It is also preferable that the polarization electrode material comprises conductive particles distributed and mixed in the base material, provided that parts of the conductive powders are shown on the surface region of the base material.

It is also preferable that the conductive particles are included in the range of 30–80% by weight.

It is further preferable that the conductive particles are included in the range of 40–70% by weight.

It is preferable that the base material electrically conductive comprises an electrically insulative base material which is mixed with a conductive material.

It is further preferable that the conductive material is included in the range of 5–30% by weight.

It is also preferable that the electrically insulative base material comprises one selected from the group consisting of a butyl rubber, a polybutadiene rubber, a polyisoprene rubber, a butadiene styrene rubber (SBR), an ethylene propylene rubber (EPM), ethylene-α-olefin copolymer and propylene-α-olefin copolymer.

It is also preferable that the electrically insulative base material comprises a sheet-shaped base member.

It is also preferable that a gasket is provided between the paired unitary-formed electrode structures and around the separator.

The third aspect of the present invention provides a method of forming a unitary-formed electrode structure serving as both a collector and a polarization electrode. The method comprises the single step of: mixing a polarization electrode material into at least a part of a surface region of a base material having an electrical conductivity, so that at least the polarization electrode material is partially shown on the surface region of the base material.

It is preferable to further comprise the single step of: removing a surface part of the base material to increase an area of the shown polarization electrode material from the surface region of the base material.

It is preferable that the surface part of the base material is removed by a plasma irradiation.

It is also preferable that the surface part of the base material is removed by a heat treatment.

It is also preferable that the surface part of the base material is removed by an ozone irradiation.

It is also preferable that the surface part of the base material is removed by making the surface part of the base material into contact with an organic solvent.

It is also preferable that the base material is sheet-shaped and the surface part to be removed is one side of the sheet.

The fourth aspect of the present invention provides a method of forming an electric double layer capacitor. The method comprises the steps of: mixing a polarization electrode material into at least a part of a surface region of a base material having an electrical conductivity for serving as the collector, so that at least the polarization electrode material is partially shown on the surface region of the base materials; removing a surface part of the base material to increase an area of the shown polarization electrode material from the surface region of the base material, thereby forming at least a pair of unitary-formed electrode structures serving as both a collector and a polarization electrode; permeating an electrolyte into the unitary-formed electrode structure; and placing the unitary-formed electrode structures to sandwich a separator.

It is preferable that the unitary-formed electrode structures are placed so that surface-removed sides of the unitary-formed electrode structures are in contact with the separator.

It is also preferable that the surface part of the base material is removed by a plasma irradiation.

It is also preferable that the surface part of the base material is removed by a heat treatment.

It is also preferable that the surface part of the base material is removed by an ozone irradiation.

It is also preferable that the surface part of the base material is removed by making the surface part of the base material into contact with an organic solvent.

It is also preferable that the base material is sheet-shaped and the surface part to be removed is one side of the sheet.

It is also preferable that the separator is placed in opening of the gasket for placing the unitary-formed electrode structures to sandwich the separator before the gasket is adhered with the unitary-formed electrode structures.

It is also preferable that the gasket is adhered with the unitary-formed electrode structures by a curing process.

In accordance with the above aspects of the present invention, the polarization electrode material is mixed in the collector to form a unitary-formed electrode structure serving both as the polarization electrode and the collector, whereby the contact resistance between the polarization electrode and the collector is reduced, and also variation in internal resistance due to variation of applied pressure to the opposite sides of the cell is suppressed. The insulative basic material is selected to have a softness or an elasticity, so that the unitary-formed electrode structure is rich in flexibility for facilitating an adhesion with the gasket. This improves the productivity of the electric double layer capacitor. The unitary-formed electrode structure further reduces the thickness of the cell of the capacitor, for example, in the 10 micrometers order. This allows size-reduction of the capacitor. Particularly, the unitary-formed electrode structure is effective to reduce the thickness or reduce the size of the electric double layer capacitor having the cell lamination structure. The reduction in thickness of the cell improves the large current characteristic of the electric double layer capacitor. Further, since the polarization electrode material is mixed in the collector to form the unitary-formed electrode structure serving both as the polarization electrode and the collector, then the polarization electrode is free from the problem in peel from the collector. This makes the capacitor free from any increase in internal resistance and improves the durability of the capacitor. The unitary-formed electrode structure allows the electric double layer capacitor to have high reliability.

Figure 2:
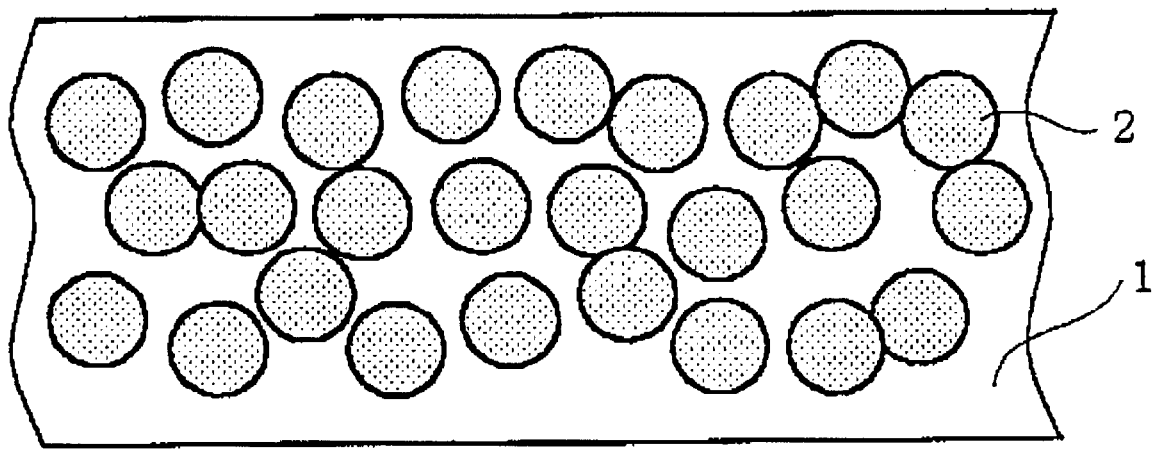
FIG. 2 is a fragmentary cross sectional elevation view illustrative of an improved unitary-formed electrode structure serving as both a collector and a polarization electrode in an electric double layer capacitor in accordance with the present invention.
Figure 3:
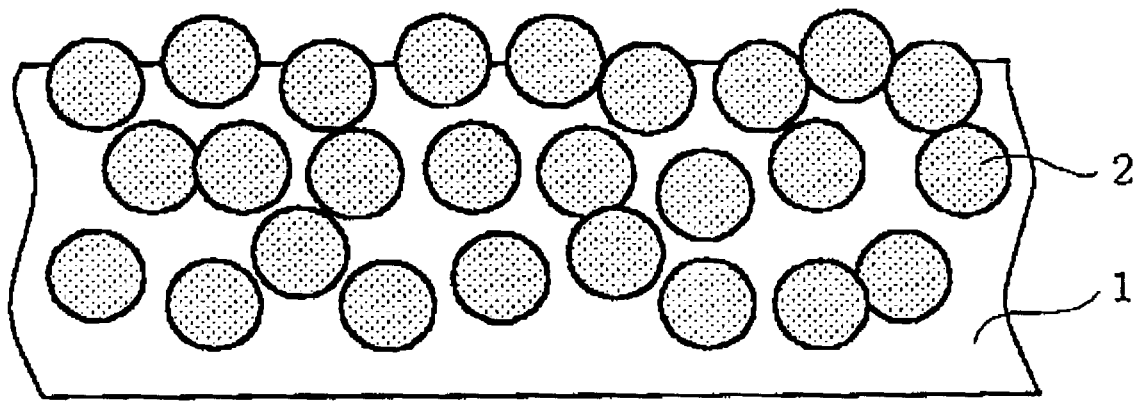
FIG. 3 is a fragmentary cross sectional elevation view illustrative of an improved unitary-formed electrode structure after one surface region has been removed so that polarization electrode materials are shown in accordance with the present invention.

FIG. 2 is a fragmentary cross sectional elevation view illustrative of an improved unitary-formed electrode structure serving as both a collector and a polarization electrode in an electric double layer capacitor in accordance with the present invention. FIG. 3 is a fragmentary cross sectional elevation view illustrative of an improved unitary-formed electrode structure after one surface region has been removed so that polarization electrode materials are shown in accordance with the present invention.

With reference to FIG. 2, the unitary-formed electrode structure serving as both a collector and a polarization electrode comprises a base material 1 and electrically conductive powders 2 dispersed in the base material 1. The base material 1 has an electrical conductivity. The base material 1 serves as a collector. The electrically conductive powders 2 serve as a polarization electrode. The base material 1 may comprise an insulative base material mixed with a conductive material. The insulative base material may comprise a rubber. The conductive material mixed in the rubber may be carbon. The electrically conductive powders 2 dispersed in the base material 1 may comprise activated carbon powders. The unitary-formed electrode structure may be shaped in a sheet. The activated carbon powders 2 for the polarization electrode material and carbon for providing an electrical conductivity are mixed in a rubber-based material such as isobutylene/isoprene. Further, a curing agent and a curing promoter are added to cause polymerization for forming a sheet-shaped unitary-formed electrode structure which comprises the base material 1 mixed with the polarization electrode material powders 2. The thickness of the sheet-shaped unitary-formed electrode structure may be several tens of micrometers.

As well illustrated in FIG. 2, most of the polarization electrode material powders 2 of activated carbon powders are not shown at surfaces of the sheet-shaped base material 1. Namely, the polarization electrode material powders 2 are shown at a low ratio from the surfaces of the sheet-shaped base material 1. This means that the most of the polarization electrode material powders 2 of activated carbon powders is not in contact with an electrolyte. Namely, the polarization electrode material powders 2 are in contact with the electrolyte at a low ratio. In order to increase an electrostatic capacity, it is necessary to increase polarization electrode material powders 2 shown from the surfaces of the sheet-shaped base material 1. For this purpose, a surface region of the sheet-shaped base material 1 is removed so that many polarization electrode material powders 2 of the activated carbon powders are shown from the surfaces of the sheet-shaped base material 1 and are in contact with the electrolyte as illustrated in FIG. 3. Namely, there is increased the surface area of the polarization electrode material powders 2 shown from the surfaces of the sheet-shaped base material 1 and are in contact with the electrolyte. The increase in surface area of the polarization electrode material powders 2 shown from the surfaces of the sheet-shaped base material 1 and in contact with the electrolyte results in a certain increase in electrostatic capacity of the capacitor.

The surface region of the sheet-shaped base material 1 may be removed by a plasma irradiation, a heat treatment such as a heat blow irradiation, or an ozone irradiation. Alternatively, the surface region of the sheet-shaped base material 1 may be removed by making the surface of the sheet-shaped base material 1 into contact with an organic solvent as a chemical.

A ratio of the polarization electrode material powders 2 of the activated carbon powders 2 to the unitary-formed electrode structure is preferably in the range of 30–80% by weight and more preferably in the range of 40–70% by weight. A ratio of the conductive material of carbon for providing the electrical conductivity to the sheet-shaped base material 1 is preferably in the range of 5–30% by weight. A butyl rubber, a polybutadiene rubber, a polyisoprene rubber, a butadiene styrene rubber (SBR), an ethylene propylene rubber (EPM), ethylene-α-olefin copolymer and propylene-α-olefin copolymer are available for the insulative base material.

The unitary formed electrode structure with the sheet-shape is permeated with an electrolyte. A pair of the unitary formed electrode structures is prepared. The unitary formed electrode structures are placed to sandwich a separator.

It is possible that the surface region of the sheet-shaped base material 1 is removed in either a single side or both sides. If the surface region of the sheet-shaped base material 1 is removed in the single side only, then the unitary formed electrode structures are placed so that surface-removed sides of the unitary formed electrode structures are in contact with the separator.

Figure 4:
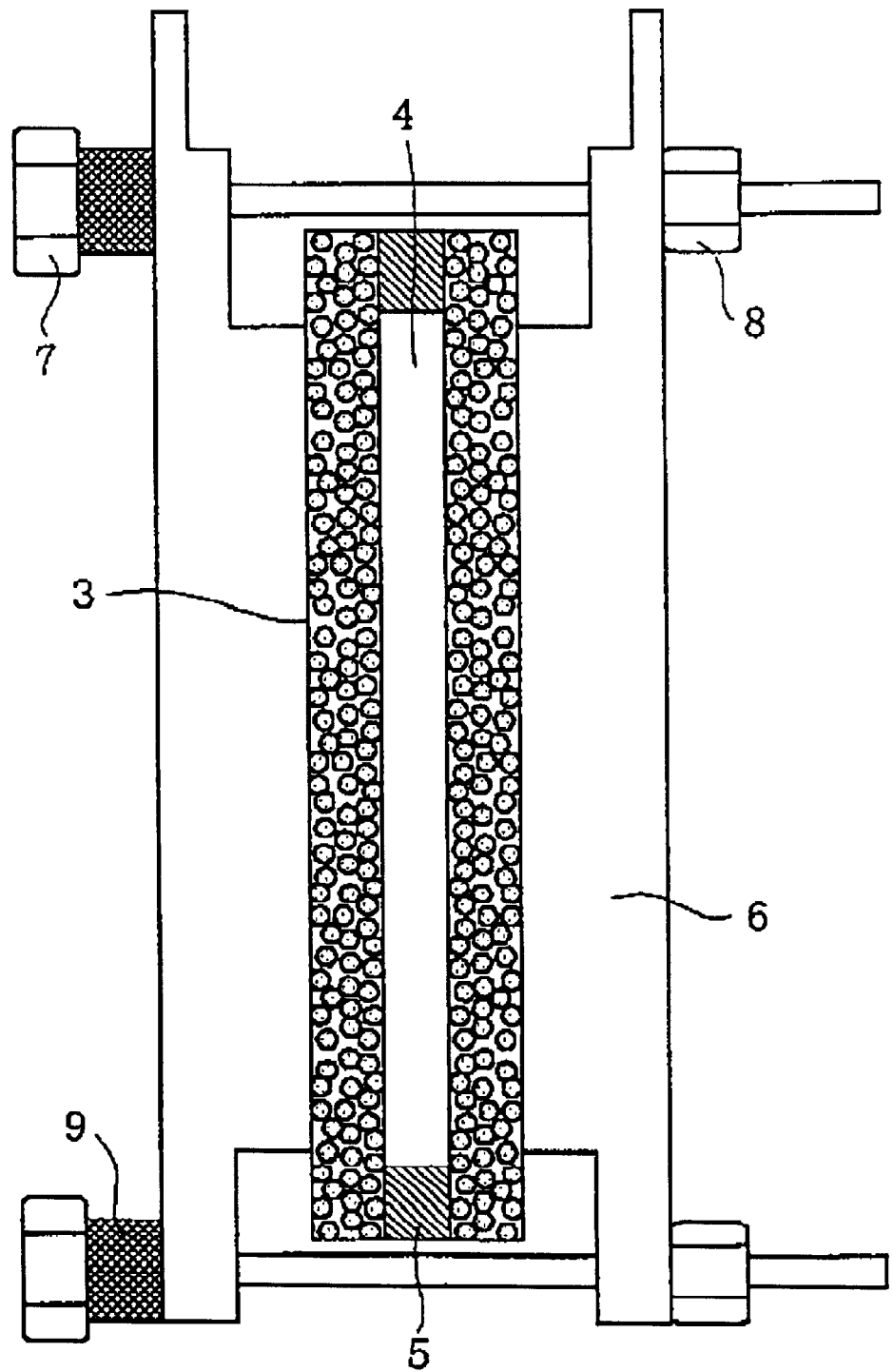
FIG. 4 is a schematic cross sectional view illustrative of a novel electric double layer capacitor having improved unitary-formed electrode structures, each serving as both a collector and a polarization electrode illustrated in FIG. 3 in accordance with the present invention.

FIG. 4 is a schematic cross sectional view illustrative of a novel electric double layer capacitor having improved unitary-formed electrode structures, each serving as both a collector and a polarization electrode illustrated in FIG. 3 in accordance with the present invention.

The electric double layer capacitor has a pair of the unitary-formed electrode structures 3 illustrated in FIG. 3. The paired unitary-formed electrode structures 3 are sheet-shaped. The sheet-shaped electrode structures 3 are separated by a separator 4. A gasket 5 is provided between the sheet-shaped electrode structures 3 and around the separator 4. Terminal plates 6 are provided which are in contact with the sheet-shaped electrode structures 3. The terminal plates 6 are pressured toward the sheet-shaped electrode structures 3 by bolts 7, nuts 8 and packings 9.

In accordance with the present invention, the polarization electrode material is mixed in the collector to form a unitary-formed electrode structure serving both as the polarization electrode and the collector, whereby the contact resistance between the polarization electrode and the collector is reduced, and also variation in internal resistance due to variation of applied pressure to the opposite sides of the cell is suppressed. The insulative basic material is selected to have a softness or an elasticity, so that the unitary-formed electrode structure is rich in flexibility for facilitating an adhesion with the gasket. This improves the productivity of the electric double layer capacitor. The unitary-formed electrode structure further reduces the thickness of the cell of the capacitor, for example, in the 10 micrometers order. This allows size-reduction of the capacitor. Particularly, the unitary-formed electrode structure is effective to reduce the thickness or reduce the size of the electric double layer capacitor having the cell lamination structure. The reduction in thickness of the cell improves the large current characteristic of the electric double layer capacitor. Further, since the polarization electrode material is mixed in the collector to form the unitary-formed electrode structure serving both as the polarization electrode and the collector, then the polarization electrode is free from the problem in peel from the collector. This makes the capacitor free from any increase in internal resistance and improves the durability of the capacitor. The unitary-formed electrode structure allows the electric double layer capacitor to have high reliability.

EXAMPLE 1

A mixture of isobutylene/isoprene at 7:3 was prepared. Activated carbon powders, carbon and the isobutylene/isoprene mixture were mixed at a weight ratio of 40:10:50. This mixture was further mixed with a curing agent of powdered sulfur at 3% by weight and a curing promoter of zinc dimethylthiocarbamate at 2% by weight for polymerization to form a sheet with a size of 85×65×0.03 mm. In order to have activated carbon powders shown from surfaces of the sheet, both surfaces of the sheet were subjected to a plasma irradiation to form a sheet-shaped electrode structure 3 which serves as both the collector and the polarization electrode. This plasma irradiation was carried out under a pressure of 1 Torr, at a temperature of 45° C., with a power of 700 W for 5 minutes. In the above manners, two sheet-shaped electrode structures 3 were prepared.

The two sheet-shaped electrode structures 3 were further immersed into an electrolyte of 40wt %-sulfuric acid solution for 24 hours so that the sheet-shaped electrode structures 3 were permeated with the electrolyte. The two sheet-shaped electrode structures 3 were pickup up from the 40wt %-sulfuric acid solution. A sheet-shaped separator 4 was prepared which comprises a porous membrane of a size of 70×50×0.02 mm. A gasket 5 made of a non-conductive butyl rubber is provided around the sheet-shaped separator 4. Namely, the sheet-shaped separator 4 is placed in an opening of the gasket 5, so that the sheet-shaped separator 4 is surrounded by the gasket 5. The two sheet-shaped electrode structures 3 were placed to sandwich the sheet-shaped separator 4 surrounded by the gasket 5. The two sheet-shaped electrode structures 3 are separated by the sheet-shaped separator 4 and the gasket 5, thereby forming a basic cell which comprises the two sheet-shaped electrode structures 3, the sheet-shaped separator 4 and the gasket 5.

The basic cell was placed in a thermostat at 120° C. where a pressure of 5 kg/cm$^2$ was applied to peripheral regions of the two sheet-shaped electrode structures 3 toward the gasket 5, so that the peripheral regions of the two sheet-shaped electrode structures 3 were pressured to the gasket 5, whereby peripheral regions of the two sheet-shaped electrode structures 3 were cure-bonded with the gasket 5 and thus the electrolyte is sealed. Paired terminal plates 6 are fixed to outsides of the two sheet-shaped electrode structures 3 with applying pressure to the two sheet-shaped electrode structures 3 toward the sheet-shaped separator 4. Four sets of a bolt 7 and a nut 8 were used to fix four corners of the paired terminal plates 6. Packings 9 made of non-conductive butyl rubber were used for electrical isolation between the paired terminal plates 6. In this example, two different samples of the electric double layer capacitor were formed in the above processes, wherein two different pressures of 20 kg/cm$^2$ and 100 kg/cm$^2$ were applied to the two sheet-shaped electrode structures 3 toward the sheet-shaped separator 4 for fixing the terminal plates 6 to the two sheet-shaped electrode structures 3. In case of the pressure of 20 kg/cm$^2$, the sample will hereinafter be referred to as Type 1. In case of the pressure of 100 kg/cm$^2$, the sample will hereinafter be referred to as Type 2.

EXAMPLE 2

In this example, in place of the plasma irradiation, a heat blow irradiation was made. A mixture of isobutylene/isoprene at 7:3 was prepared. Activated carbon powders, carbon and the isobutylene/isoprene mixtures were mixed at a weight ratio of 40:10:50. This mixture was further mixed with a curing agent of powdered sulfur at 3% by weight and a curing promoter of zinc dimethylthiocarbamate at 2% by weight for polymerization to form a sheet with a size of 85×65×0.03 mm. In order to have activated carbon powders shown from surfaces of the sheet, both surfaces of the sheet were subjected to a heat blow irradiation to form a sheet-shaped electrode structure 3 which serves as both the collector and the polarization electrode. This heat blow irradiation was carried out by irradiating a heat blow of 200° C.

The two sheet-shaped electrode structures 3 were further immersed into an electrolyte of 40wt %-sulfuric acid solution for 24 hours so that the sheet-shaped electrode structures 3 were permeated with the electrolyte. The two sheet-shaped electrode structures 3 were picked up from the 40wt %-sulfuric acid solution. A sheet-shaped separator 4 was prepared which comprises a porous membrane of a size of 70×50×0.02 mm. A gasket 5 made of a non-conductive butyl rubber is provided around the sheet-shaped separator 4. Namely, the sheet-shaped separator 4 is placed in an opening of the gasket 5, so that the sheet-shaped separator 4 is surrounded by the gasket 5. The two sheet-shaped electrode structures 3 were placed to sandwich the sheet-shaped separator 4 surrounded by the gasket 5. The two sheet-shaped electrode structures 3 are separated by the sheet-shaped separator 4 and the gasket 5, thereby forming a basic cell which comprises the two sheet-shaped electrode structures 3, the sheet-shaped separator 4 and the gasket 5.

The basic cell was placed in a thermostat at 120° C. where a pressure of 5 kg/cm$^2$ was applied to peripheral regions of the two sheet-shaped electrode structures 3 toward the gasket 5, so that the peripheral regions of the two sheet-shaped electrode structures 3 were pressured to the gasket 5, whereby peripheral regions of the two sheet-shaped electrode structures 3 were cure-bonded with the gasket 5 and thus the electrolyte is sealed. Paired terminal plates 6 are fixed to outsides of the two sheet-shaped electrode structures 3 with applying pressure to the two sheet-shaped electrode structures 3 toward the sheet-shaped separator 4. Four sets of a bolt 7 and a nut 8 were used to fix four corners of the paired terminal plates 6. Packings 9 made of non-conductive butyl rubber were used for electrical isolation between the paired terminal plates 6. In this example, two different samples of the electric double layer capacitor were formed in the above processes, wherein two different pressures of 20 kg/cm$^2$ and 100 kg/cm$^2$ were applied to the two sheet-shaped electrode structures 3 toward the sheet-shaped separator 4 for fixing the terminal plates 6 to the two sheet-shaped electrode structures 3. In case of the pressure of 20 kg/cm$^2$, the sample will hereinafter be referred to as Type 1. In case of the pressure of 100 kg/cm$^2$, the sample will hereinafter be referred to as Type 2.

EXAMPLE 3

A mixture of isobutylene/isoprene at 7:3 was prepared. Activated carbon powders, carbon and the isobutylene/isoprene mixture were mixed at a weight ratio of 40:10:50. This mixture was further mixed with a curing agent of powdered sulfur at 3% by weight and a curing promoter of zinc dimethylthiocarbamate at 2% by weight for polymerization to form a sheet with a size of 85×65×0.03 mm. In order to have activated carbon powders shown from surfaces of the sheet, both surfaces of the sheet were made into contact with a toluene solution for one hours. In the above manners, two sheet-shaped electrode structures 3 were prepared.

The two sheet-shaped electrode structures 3 were further immersed into an electrolyte of 40wt %-sulfuric acid solution for 24 hours so that the sheet-shaped electrode structures 3 were permeated with the electrolyte. The two sheet-shaped electrode structures 3 were picked up from the 40wt %-sulfuric acid solution. A sheet-shaped separator 4 was prepared which comprises a porous membrane of a size of 70×50×0.02 mm. A gasket 5 made of a non-conductive butyl rubber is provided around the sheet-shaped separator 4. Namely, the sheet-shaped separator 4 is placed in an opening of the gasket 5, so that the sheet-shaped separator 4 is surrounded by the gasket 5. The two sheet-shaped electrode structures 3 were placed to sandwich the sheet-shaped separator 4 surrounded by the gasket 5. The two sheet-shaped electrode structures 3 are separated by the sheet-shaped separator 4 and the gasket 5, thereby forming a basic cell which comprises the two sheet-shaped electrode structures 3, the sheet-shaped separator 4 and the gasket 5.

The basic cell was placed in a thermostat at 120° C. where a pressure of 5 kg/cm$^2$ was applied to peripheral regions of the two sheet-shaped electrode structures 3 toward the gasket 5, so that the peripheral regions of the two sheet-shaped electrode structures 3 were pressured to the gasket 5, whereby peripheral regions of the two sheet-shaped electrode structures 3 were cure-bonded with the gasket 5 and thus the electrolyte is sealed. Paired terminal plates 6 are fixed to outsides of the two sheet-shaped electrode structures 3 with applying pressure to the two sheet-shaped electrode structures 3 toward the sheet-shaped separator 4. Four sets of a bolt 7 and a nut 8 were used to fix four corners of the paired terminal plates 6. Packings 9 made of non-conductive butyl rubber were used for electrical isolation between the paired terminal plates 6. In this example, two different samples of the electric double layer capacitor were formed in the above processes, wherein two different pressures of 20 kg/cm$^2$ and 100 kg/cm$^2$ were applied to the two sheet-shaped electrode structures 3 toward the sheet-shaped separator 4 for fixing the terminal plates 6 to the two sheet-shaped electrode structures 3. In case of the pressure of 20 kg/cm$^2$, the sample will hereinafter be referred to as Type 1. In case of the pressure of 100 kg/cm$^2$, the sample will hereinafter be referred to as Type 2.

EXAMPLE 4

A mixture of isobutylene/isoprene at 7:3 was prepared. Activated carbon powders, carbon and the isobutylene/isoprene mixture were mixed at a weight ratio of 40:10:50. This mixture was further mixed with a curing agent of powdered sulfur at 3% by weight and a curing promoter of zinc dimethylthiocarbamate at 2% by weight for polymerization to form a sheet with a size of 85×65×0.03 mm. In order to have activated carbon powders shown from surfaces of the sheet, both surfaces of the sheet were subjected to an ozone irradiation to form a sheet-shaped electrode structure 3 which serves as both the collector and the polarization electrode. This ozone irradiation was carried out by heating an air with an ozone concentration of 100 g/cm$^3$ to a temperature of 70° C., for subsequent blowing the heated ozone at 5E-2 NM$^3$/min. In the above manners, two sheet-shaped electrode structures 3 were prepared.

The two sheet-shaped electrode structures 3 were further immersed into an electrolyte of 40wt %-sulfuric acid solution for 24 hours so that the sheet-shaped electrode structures 3 were permeated with the electrolyte. The two sheet-shaped electrode structures 3 were picked up from the 40wt %-sulfuric acid solution. A sheet-shaped separator 4 was prepared which comprises a porous membrane of a size of 70×50×0.02 mm. A gasket 5 made of a non-conductive butyl rubber is provided around the sheet-shaped separator 4. Namely, the sheet-shaped separator 4 is placed in an opening of the gasket 5, so that the sheet-shaped separator 4 is surrounded by the gasket 5. The two sheet-shaped electrode structures 3 were placed to sandwich the sheet-shaped separator 4 surrounded by the gasket 5. The two sheet-shaped electrode structures 3 are separated by the sheet-shaped separator 4 and the gasket 5, thereby forming a basic cell which comprises the two sheet-shaped electrode structures 3, the sheet-shaped separator 4 and the gasket 5.

The basic cell was placed in a thermostat at 120° C. where a pressure of 5 kg/cm$^2$ was applied to peripheral regions of the two sheet-shaped electrode structures 3 toward the gasket 5, so that the peripheral regions of the two sheet-shaped electrode structures 3 were pressured to the gasket 5, whereby peripheral regions of the two sheet-shaped electrode structures 3 were cure-bonded with the gasket 5 and thus the electrolyte is sealed. Paired terminal plates 6 are fixed to outsides of the two sheet-shaped electrode structures 3 with applying pressure to the two sheet-shaped electrode structures 3 toward the sheet-shaped separator 4. Four sets of a bolt 7 and a nut 8 were used to fix four corners of the paired terminal plates 6. Packings 9 made of non-conductive butyl rubber were used for electrical isolation between the paired terminal plates 6. In this example, two different samples of the electric double layer capacitor were formed in the above processes, wherein two different pressures of 20 kg/cm$^2$ and 100 kg/cm$^2$ were applied to the two sheet-shaped electrode structures 3 toward the sheet-shaped separator 4 for fixing the terminal plates 6 to the two sheet-shaped electrode structures 3. In case of the pressure of 20 kg/cm$^2$, the sample will hereinafter be referred to as Type 1. In case of the pressure of 100 kg/cm$^2$, the sample will hereinafter be referred to as Type 2.

COMPARATIVE EXAMPLE 1

In this comparative example, surface regions of the sheet were not removed. A mixture of isobutylene/isoprene at 7:3 was prepared. Activated carbon powders, carbon and the isobutylene/isoprene mixture were mixed at a weight ratio of 40:10:50. This mixture was further mixed with a curing agent of powdered sulfur at 3% by weight and a curing promoter of zinc dimethylthiocarbamate at 2% by weight for polymerization to form a sheet with a size of 85×65×0.03 mm. In the above manners, two sheet-shaped electrode structures 3 were prepared.

The two sheet-shaped electrode structures 3 were further immersed into an electrolyte of 40wt %-sulfuric acid solution for 24 hours so that the sheet-shaped electrode structures 3 were permeated with the electrolyte. The two sheet-shaped electrode structures 3 were picked up from the 40wt %-sulfuric acid solution. A sheet shaped separator 4 was prepared which comprises a porous membrane of a size of 70×50×0.02 mm. A gasket 5 made of a non-conductive butyl rubber is provided around the sheet-shaped separator 4. Namely, the sheet-shaped separator 4 is placed in an opening of the gasket 5, so that the sheet-shaped separator 4 is surrounded by the gasket 5. The two sheet-shaped electrode structures 3 were placed to sandwich the sheet-shaped separator 4 surrounded by the gasket 5. The two sheet-shaped electrode structures 3 are separated by the sheet-shaped separator 4 and the gasket 5, thereby forming a basic cell which comprises the two sheet-shaped electrode structures 3, the sheet-shaped separator 4 and the gasket 5.

The basic cell was placed in a thermostat at 120° C. where a pressure of 5 kg/cm$^2$ was applied to peripheral regions of the two sheet-shaped electrode structures 3 toward the gasket 5, so that the peripheral regions of the two sheet-shaped electrode structures 3 were pressured to the gasket 5, whereby peripheral regions of the two sheet-shaped electrode structures 3 were cure-bonded with the gasket 5 and thus the electrolyte is sealed. Paired terminal plates 6 are fixed to outsides of the two sheet-shaped electrode structures 3 with applying pressure to the two sheet-shaped electrode structures 3 toward the sheet-shaped separator 4. Four sets of a bolt 7 and a nut 8 were used to fix four corners of the paired terminal plates 6. Packings 9 made of non-conductive butyl rubber were used for electrical isolation between the paired terminal plates 6. In this example, two different samples of the electric double layer capacitor were formed in the above processes, wherein two different pressures of 20 kg/cm$^2$ and 100 kg/cm$^2$ were applied to the two sheet-shaped electrode structures 3 toward the sheet-shaped separator 4 for fixing the terminal plates 6 to the two sheet-shaped separator 4 for fixing the terminal plates 6 to the two sheet-shaped electrode structures 3. In case of the pressure of 20 kg/cm$^2$, the sample will hereinafter be referred to as Type 1. In case of the pressure of 100 kg/cm$^2$, the sample will hereinafter be referred to as Type 2.

COMPARATIVE EXAMPLE 2

A polarization electrode and a collector were separately formed. The polarization electrodes 10 were formed by mixing activated carbon powders and powdered phenol resin as binder at a weight ratio of 6:4 and subsequent formation of the mixture in a sheet prior to a heat treatment to the mixture at 900° C. in a nitrogen atmosphere. The collectors 11 were formed of a 50%-carbon containing butyl rubber. The two polarization electrodes 10 have a size of 70×50×0.10 mm. The two collectors 11 have a size of 85×65×0.03 mm.

The polarization electrodes 10 were further immersed into an electrolyte of 40wt %-sulfuric acid solution for 24 hours so that the two polarization electrodes 10 were permeated with the electrolyte. The two polarization electrodes 10 were picked up from the 40wt %-sulfuric acid solution. A sheet-shaped separator 12 was prepared which comprises a porous membrane of a size of 70×50×0.02 mm. The two polarization electrodes 10 were placed to sandwich the sheet-shaped separator 12 to form a sandwiched structure comprising the sheet-shaped separator 12 and the polarization electrodes 10. A gasket 13 made of a non-conductive butyl rubber is provided around the sandwiched structure comprising the sheet-shaped separator 12 and the polarization electrodes 10. Namely, the sandwiched structure comprising the sheet-shaped separator 12 and the polarization electrodes 10 is placed in an opening of the gasket 13, so that the sandwiched structure is surrounded by the gasket 13. The two collectors 11 were placed to sandwich the sandwiched structure surrounded by the gasket 13. The two collectors 11 are separated by the sandwiched structure and the gasket 13, thereby forming a basic cell which comprises the two collectors 11, the two polarization electrodes 10, the sheet-shaped separator 12 and the gasket 13.

The basic cell was placed in a thermostat at 120° C. where a pressure of 5 kg/cm$^2$ was applied to peripheral regions of the two collectors 11 toward the gasket 13, so that the peripheral regions of the two collectors 11 were pressured to the gasket 13, whereby peripheral regions of the two collectors 11 were cure-bonded with the gasket 5 and thus the electrolyte is sealed. Paired terminal plates 14 are fixed to outsides of the two collectors 11 with applying pressure to the two collectors 11 toward the sheet-shaped separator 4. Four sets of a bolt and a nut were used to fix four corners of the paired terminal plates 14. Packings made of non-conductive butyl rubber were used for electrical isolation between the paired terminal plates 14. In this example, two different samples of the electric double layer capacitor were formed in the above processes, wherein two different pressures of 20 kg/cm² and 100 kg/cm² were applied to the two collectors 11 toward the sheet-shaped separator 12 for fixing the terminal plates 14 to the two collectors 11. In case of the pressure of 20 kg/cm², the sample will hereinafter be referred to as Type 1. In case of the pressure of 100 kg/cm², the sample will hereinafter be referred to as Type 2.

EVALUATION 1

The electric double layer capacitors of Types 1 and 2 in the above examples 1, 2, 3 and 4 as well as in the comparative examples 1 and 2 were evaluated on the equivalent series resistance (ESR), the electrostatic capacity and the thickness of the basic cell.

In order to measure the equivalent series resistance (ESR), an alternating current of 1 kHz and 10 m/Vrms was applied to the basic cell to measure a current and a phase difference.

In order to measure the first electrostatic capacity, a direct current voltage of 900 mV was applied to the basic cell of the samples 2 for 30 minutes before a discharge was carried out at 2.5 mA per 1 cm2 of apparent area of electrode. From a discharge curve, a calculation was made to where the discharge voltage is in the range of 60–50% of the charge voltage, so that the electrostatic capacity was measured.

In order to measure the second electrostatic capacity, a direct current voltage of 900 mV was applied to the basic cell of the samples 2 for 30 minutes before a discharge was carried out a 250 mA per 1 cm2 of apparent area of electrode. From a discharge curve, a calculation was made to where the discharge voltage is in the range of 60–50% of the charge voltage, so that the electrostatic capacity was measured.

In order to measure the thickness of the basic cell of the samples 2, a center portion of the terminal plates was measured by use of calipers and the thickness of the terminal plates were subtracted from the measured value.

The following table 1 shows equivalent series resistances (ESR) of types 1 and 2 of the electric double layer capacitors, electrostatic capacities of the type 2 of the electric double layer capacitors through different discharges at 2.5 mA/cm² and 250 mA/cm², and thicknesses of the cells of the type 2 of the electric double layer capacitors in the above examples 1, 2, 3 and 4, and the above comparative examples 1 and 2.

TABLE 1

| | ESR (mΩ) Type 1 | ESR (mΩ) Type 2 | Capacity (F) 2.5 mA/cm² | Capacity (F) 250 mA/cm² | T (mm) Type 2 |
|---|---|---|---|---|---|
| Ex. 1 | 5.9 | 5.4 | 0.193 | 0.180 | 0.080 |
| Ex. 2 | 7.4 | 6.5 | 0.187 | 0.168 | 0.081 |
| Ex. 3 | 6.3 | 5.8 | 0.185 | 0.174 | 0.080 |
| Ex. 4 | 7.0 | 6.4 | 0.213 | 0.194 | 0.080 |
| Comp. 1 | 17.2 | 11.4 | 0.068 | 0 | 0.081 |
| Comp. 2 | 14.4 | 7.1 | 3.91 | 2.66 | 0.284 |

The measured equivalent series resistances (ESR) of types 1 and 2 of the electric double layer capacitors in the above examples 1, 2, 3 and 4 are apparently lower than the measured equivalent series resistances (ESR) of types 1 and 2 of the electric double layer capacitors in the above comparative examples 1 and 2. By comparing the comparative example 1 to the examples 1, 2, 3 and 4, it is understood that removal of the surface region of the base material 1 to have the polarization electrode material powders 2 shown from the surface of the base material 1 as shown in FIG. 3 results in decrease in the equivalent series resistance (ESR) of the capacitor. The polarization electrode material powders 2 of the activated carbon powders is lower in specific resistivity than the base material of conductive butyl rubber. By comparing the comparative example 2 to the examples 1, 2, 3 and 4, it is understood that the polarization electrode material powders 2 of the activated carbon powders exist in the base material 1 serving as the collector, wherein the polarization electrode material powders 2 of the activated carbon powders tightly fit with the collector, whereby the contact resistance between the polarization electrode and the collector is remarkably reduced.

In the comparative example 2, the measured equivalent series resistance (ESR) of type 1 is about two times of the measured equivalent series resistance (ESR) of type 2. By contrast, in the examples 1, 2, 3 and 4, the measured equivalent series resistance (ESR) of type 1 is higher by about 10% only than the measured equivalent series resistance (ESR) of type 2. The electric double layer capacitors in the above examples 1, 2, 3 and 4 show smaller variations in equivalent series resistance (ESR) to variation of the applied pressure to the cells as compared to the electric double layer capacitors in the comparative examples 1 and 2. The polarization electrode material powders 2 of the activated carbon powders tightly fit with the collector without applying a large pressure, whereby the contact resistance between the polarization electrode and the collector is remarkably reduced.

Differences in the measured electrostatic capacities of the sample 2 of the electric double layer capacitors in the examples 1, 2, 3 and 4 between the different discharge currents of 2.5 mA/cm2 and 250 mA/cm2 are small as compared to the comparative example 1. The measured electrostatic capacities of the examples 1, 2, 3 and 4 show small variations in electrostatic capacity to the variation of the discharge current as compared to the comparative example 1. The polarization electrode material 2 shown from the surface of the base material 1 not only increases the electrostatic capacity but also suppresses variations in electrostatic capacity to the variation in the discharge current.

The measured electrostatic capacities of the sample 2 of the electric double layer capacitors in the examples 1, 2, 3 and 4 at the different discharge currents of 2.5 mA/cm2 and 250 mA/cm2 are much smaller than or, for example, about one tenth of the electrostatic capacity of the electric double layer capacitor in the comparative example 2. The measured electrostatic capacities of the sample 2 of the electric double layer capacitors in the examples 1, 2, 3 and 4 at the discharge current of 250 mA/cm2 is smaller by about 10% than the measured electrostatic capacities of the sample 2 of the electric double layer capacitors in the examples 1, 2, 3 and 4 at the discharge current of 2.5 mA/cm2. By contrast the measured electrostatic capacity of the sample 2 of the electric double layer capacitor in the comparative example 2 at the discharge current of 250 mA/cm2 is smaller by not less than 30% than measured electrostatic capacity at the discharge current of 2.5 mA/cm2. Those mean that the electric double layer capacitors in the examples 1, 2, 3 and 4 are superior in large current discharge characteristics than the electric double layer capacitor in the comparative example 2.

The measured electrostatic capacity of the electric double layer capacitor in the example 4 is large than the measured electrostatic capacities of the electric double layer capacitors in the examples 1, 2 and 3. The activated carbon as the polarization electrode material are oxidized by ozone to generate an oxygen-containing surface functional group.

The thicknesses of the cells the electric double layer capacitors of type 2 in the examples 1, 2, 3 and 4 are smaller than the thickness of the cell of the electric double layer capacitor in the comparative example 2.

From the above, it is understood that the electrode double layer capacitors in the examples 1, 2, 3 and 4 are superior in equivalent series resistance (ESR), electrostatic capacity and cell thickness.

EXAMPLE 5

A mixture of isobutylene/isoprene at 7:3 was prepared. Activated carbon powders, carbon and the isobutylene/isoprene mixture were mixed at a weight ratio of 10:10:80. Further, activated carbon powders, carbon and the isobutylene/isoprene mixture was mixed at another weight ratio of 20:10:70. Also, activated carbon powders, carbon and the isobutylene/isoprene mixture were mixed at another weight ratio of 30:10:60. Also, activated carbon powders, carbon and the isobutylene/isoprene mixture were mixed at another weight ratio of 40:10:50. Also, activated carbon powders, carbon and the isobutylene/isoprene mixture were mixed at another weight ratio of 50:10:40. Also, activated carbon powders, carbon and the isobutylene/isoprene mixture was mixed at another weight ratio of 60:10:30. Also, activated carbon powders, carbon and the isobutylene/isoprene mixture was mixed at another weight ratio of 70:10:20. Also, activated carbon powders, carbon and the isobutylene/isoprene mixture were mixed at another weight ratio of 80:10:10. Those mixtures of eight different types in weight ratio of the activated carbon powders were further mixed with a curing agent of powdered sulfur at 3% by weigh and a curing promoter of zinc dimethylthiocarbamate at 2% by weight for polymerization to form sheets of eighth different types in weight ratio of the activated carbon powders with a uniform size of 85×65×0.03 mm. In order to have activated carbon powders shown from surfaces of the sheet, both surfaces of the sheets were subjected to a plasma irradiation to form sheet-shaped electrode structures 3 of eight different types in weight ratio of the activated carbon powders, wherein the sheet-shaped electrode structure 3 serve as both the collector and the polarization electrode. This plasma irradiation was carried out under a pressure of 1 Torr, at a temperature of 45° C., with a power of 700W for 5 minutes. In the above manners, two sets of the sheet-shaped electrode structures 3 of eight different types in weight ratio of the activated carbon powders were prepared. Each of the sheet-shaped electrode structures 3 of eight different types in weight ratio of the activated carbon powders was measured in real surface area, wherein the samples of the sheets were shaped in 68×48 mm and a Bet absorption method was used to measure an amount of absorbed nitrogen gas at a liquid nitrogen temperature.

The two sets of the sheet-shaped electrode structures 3 of eight different types in weight ratio of the activated carbon powders were further immersed into an electrolyte of 40 wt %-sulfuric acid solution for 24 hours so that the sheet-shaped electrode structures 3 of eight different types in weight ratio of the activated carbon powders were permeated with the electrolyte. The two sets of the sheet-shaped electrode structures 3 of eight different types in weight ratio of the activated carbon powders were picked up from the 40wt %-sulfuric acid solution. A sheet-shaped separator 4 was prepared which comprises a porous membrane of a size of 70×50×0.02 mm. A gasket 5 made of a non-conductive butyl rubber was provided around the sheet-shaped separator 4. Namely, the sheet-shaped separator 4 was placed in an opening of the gasket 5, so that the sheet-shaped separator 4 was surrounded by the gasket 5. The two sheet-shaped electrode structures 3 of the same type were placed to sandwich the sheet-shaped separator 4 surrounded by the gasket 5. The two sheet-shaped electrode structures 3 of the same type are separated by the sheet-shaped separator 4 and the gasket 5, thereby forming a basic cell which comprises the two sheet-shaped electrode structures 3, the sheet-shaped separator 4 and the gasket 5. The cell was prepared in the same manner for every eight different types in weight ratio of the activated carbon powders.

Each of the basic cells of eight different types in weight ratio of the activated carbon powders was placed in a thermostat at 120° C. where a pressure of 5 kg/cm$^2$ was applied to peripheral regions of the two sheet-shaped electrode structures 3 toward the gasket 5, so that the peripheral regions of the two sheet-shaped electrode structures 3 were pressured to the gasket 5, whereby peripheral regions of the two sheet-shaped electrode structures 3 were cure-bonded with the gasket 5 and thus the electrolyte is sealed. Paired terminal plates 6 are fixed to outsides of the two sheet-shaped electrode structures 3 with applying a pressure of 100 kg/cm$^2$ to the two sheet-shaped electrode structures 3 toward the sheet-shaped separator 4. Four sets of a bolt 7 and a nut 8 were used to fix four corners of the paired terminal plates 6. Packings 9 made of non-conductive butyl rubber were used for electrical isolation between the paired terminal plates 6. The capacitor was prepared in the same manner for every eight different types in weight ratio of the activated carbon powders.

EVALUATION 2

Figure 5:
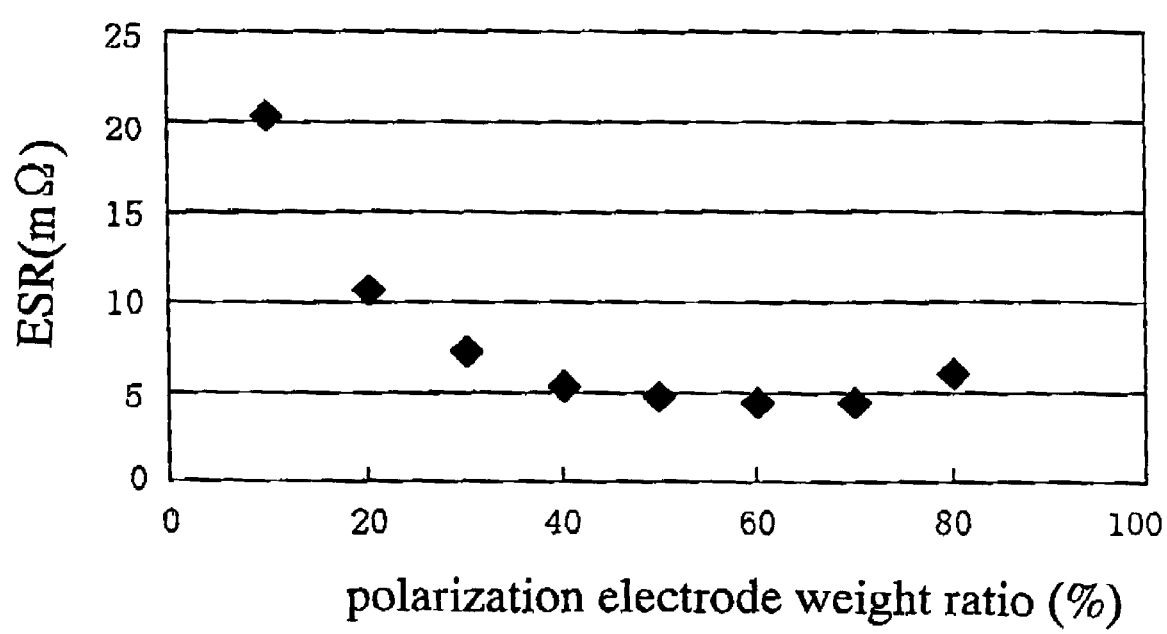
FIG. 5 is a diagram illustrative of variations of equivalent series resistance (ESR) of the electric double layer capacitors versus variation in weight ratio of the activated carbon powders.

FIG. 5 is a diagram illustrative of variations of equivalent series resistance (ESR) of the electric double layer capacitors versus variation in weight ratio of the activated carbon powders. As the weight ratio of the activated carbon powders is increased from 10% to 40%, then the equivalent series resistance of the electric double layer capacitor is decreased. As the weight ratio of the activated carbon powders is in the range of 40%–70%, then the equivalent series resistance of the electric double layer capacitor remains low. As the weight ratio of the activated carbon powders is increased from 70% to 80%, then the equivalent series resistance of the electric double layer capacitor is slightly increased due to reduction in binding force between the activated carbon powders and the collector.

Figure 6:
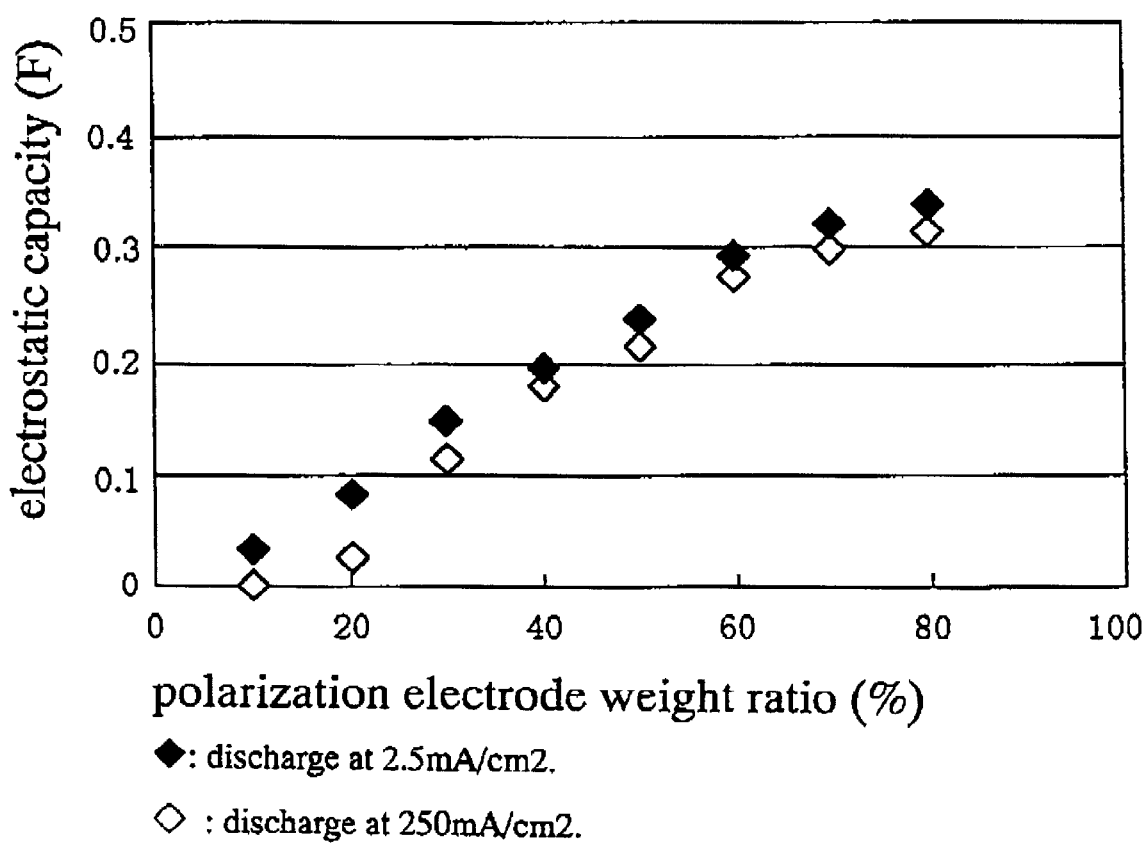
FIG. 6 is a diagram illustrative of variations of electrostatic capacity of the electric double layer capacitor versus variation in weight ratio of the activated carbon powders in both cases of different discharge currents of 2.5 mA/cm2 and 250 mA/cm2.

FIG. 6 is a diagram illustrative of variations of electrostatic capacity of the electric double layer capacitor versus variation in weight ratio of the activated carbon powders in both cases of different discharge currents of 2.5 mA/cm2 and 250 mA/cm2. ◆ represents the electrostatic capacity at 2.5 mA/cm2. ◇ represents the electrostatic capacity at 250 mA/cm2. In both cases of different discharge currents of 2.5 mA/cm2 and 250 mA/cm2, as the weight ratio of the activated carbon powders is increased, the electrostatic capacity of the electric double layer capacitor is also simply increased. As the weight ratio of the activated carbon powders is less than 40%, then a difference in electrostatic capacity of the electric double layer capacitor between the different discharge currents of 2.5 mA/cm2 and 250 mA/cm2 is not so small. As the weight ratio of the activated carbon powders is not less than 40%, then a difference in electrostatic capacity of the electric double layer capacitor between the different discharge currents of 2.5 mA/cm2 and 250 mA/cm2 is small.

Figure 7:
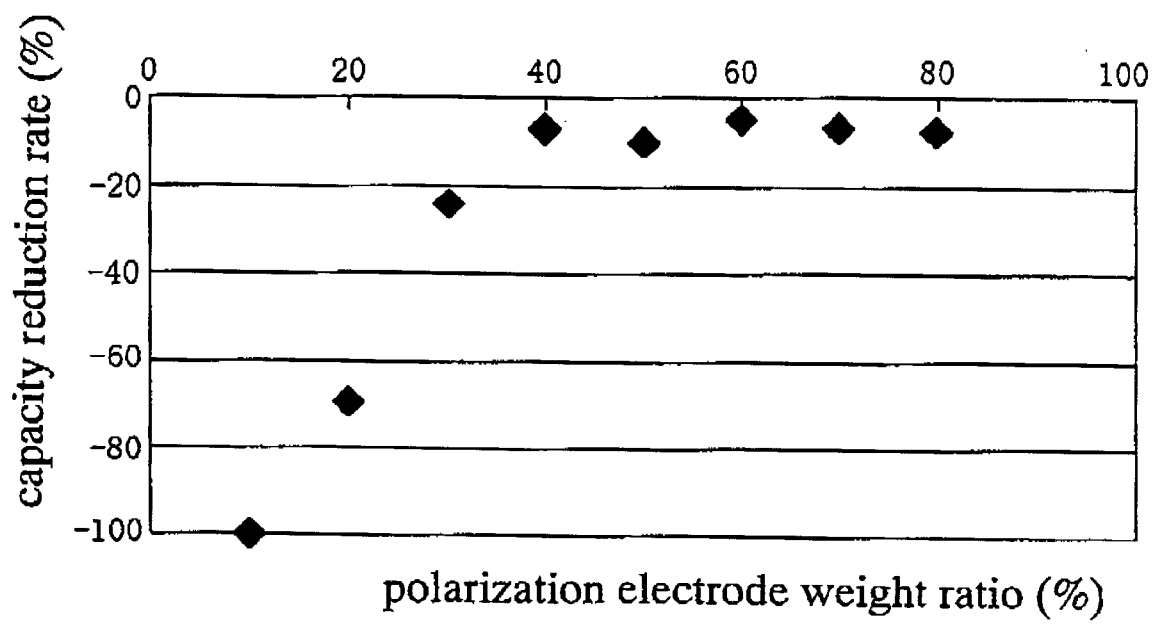
FIG. 7 is a diagram illustrative of variations of reduction rate of electrostatic capacity of the electric double layer capacitor by increasing discharge current of 2.5 mA/cm2 to higher discharge current of 250 mA/cm2 versus variation in weight ratio of the activated carbon powders.

FIG. 7 is a diagram illustrative of variations of reduction rate of electrostatic capacity of the electric double layer capacitor by increasing discharge current of 2.5 mA/cm2 to higher discharge current of 250 mA/cm2 versus variation in weight ratio of the activated carbon powders. As the weight ratio of the activated carbon powders is decreased from 40%, then the reduction rate of electrostatic capacity of the electric double layer capacitor by increasing discharge current of 2.5 mA/cm2 to higher discharge current of 250 mA/cm2 is rapidly increased. As the weight ratio of the activated carbon powders is in the range of 40% to 80%, then the reduction rate of electrostatic capacity of the electric double layer capacitor by increasing discharge current of 2.5 mA/cm2 to higher discharge current of 250 mA/cm2 almost remains unchanged to be low.

From FIGS. 5, 6 and 7, it is understood that the preferable range of the weight ratio of the activated carbon powders is 30–80% and more preferable range of the weight ratio of the activated carbon powders is 40–70%.

Figure 8:
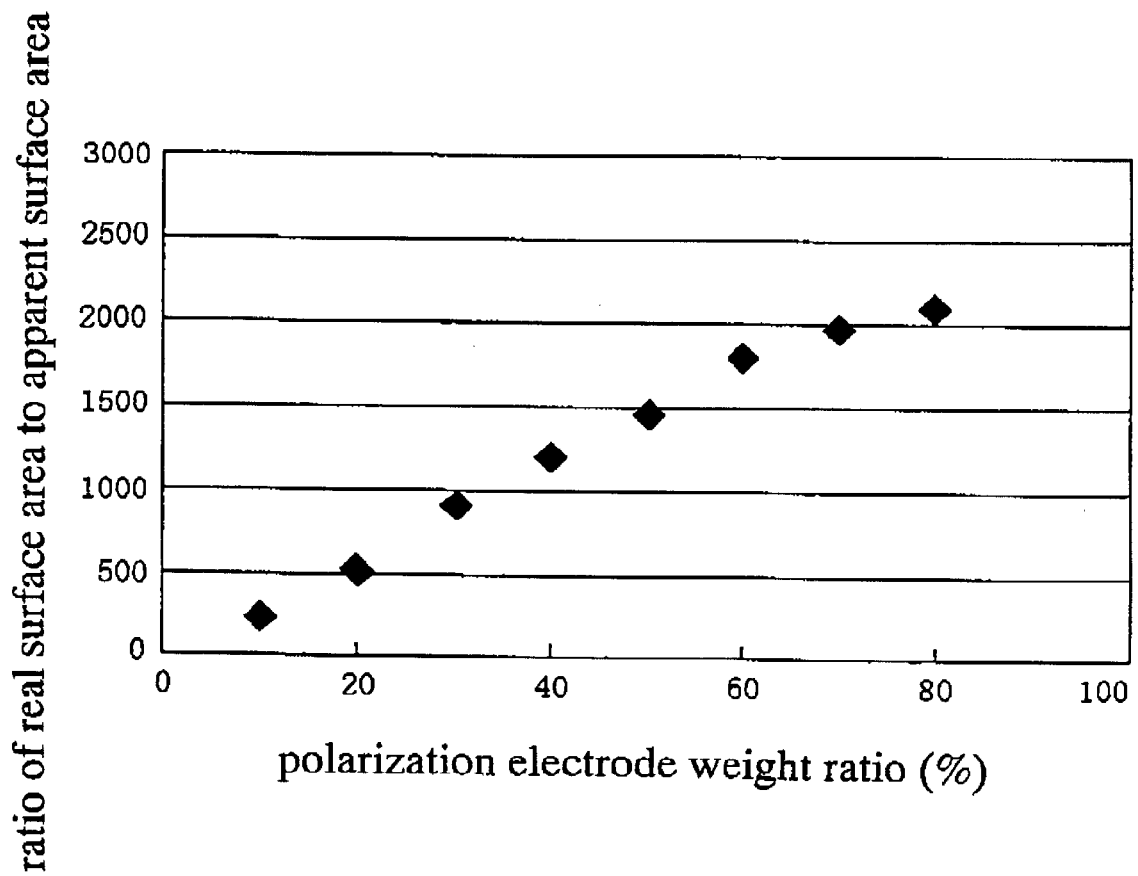
FIG. 8 is a diagram illustrative of variations of ratio of real surface area to apparent surface area of the polarization electrode of the electric double layer capacitor versus variation in weight ratio of the activated carbon powders.

FIG. 8 is a diagram illustrative of variations of ratio of real surface area to apparent surface area of the polarization electrode of the electric double layer capacitor versus variation in weight ratio of the activated carbon powders. As the weight ratio of the activated carbon powders is increased, then the ratio of real surface area to apparent surface area of the polarization electrode is also simply increased. As the weight ratio of the activated carbon powders is in the most preferable range of 40–70%, then the ratio of real surface area to apparent surface area of the polarization electrode is more than 1000.

EXAMPLE 6

A mixture of isobutylene/isoprene at 7:3 was prepared. Activated carbon powders, carbon and the isobutylene/isoprene mixture were mixed at a weight ratio of 40:1:59. Further, activated carbon powders, carbon and the isobutylene/isoprene mixture were mixed at another weight ratio of 40:3:57. Also, activated carbon powders, carbon and the isobutylene/isoprene mixture were mixed at another weight ratio of 40:5:55. Also, activated carbon powders, carbon and the isobutylene/isoprene mixture were mixed at another weight ratio of 40:10:50. Also, activated carbon powders, carbon and the isobutylene/isoprene mixture were mixed at another weight ratio of 40:15:45. Also, activated carbon powders, carbon and the isobutylene/isoprene mixture were mixed at another weight ratio of 40:20:40. Also, activated carbon powders, carbon and the isobutylene/isoprene mixture were mixed at another weight ratio of 40:30:30. Those mixtures of seven different types in weight ratio of carbon were further mixed with a curing agent of powdered sulfur at 3% by weight and a curing promoter of zinc dimethylthiocarbamate at 2% by weight for polymerization to form sheets of seven different types in weight ratio of carbon with a uniform size of 85×65×0.03 mm. In order to have activated carbon powders shown from surfaces of the sheet, both surfaces of the sheets were subjected to a plasma irradiation to form sheet-shaped electrode structures 3 of seven different types in weight ratio of carbon, wherein the sheet-shaped electrode structure 3 serve as both the collector and the polarization electrode. This plasma irradiation was carried out under a pressure of 1 Torr, at a temperature of 45° C., with a power of 700W for 5 minutes. In the above manners, two sets of the sheet-shaped electrode structures 3 of seven different types in weight ratio of carbon were prepared. Each of the sheet-shaped electrode structures 3 of seven different types in weight ratio of carbon was measured in specific resistivity and steam-transmittance, wherein measurement of the specific resistivity was carried out in a direct current four-terminal method by measuring voltages across terminals upon application of different currents of 0.1 mA, 1 mA and 10 mA. The steam-transmittance was measured in accordance with ASTM D 1434-75.

The two sets of the sheet-shaped electrode structures 3 of seven different types in weight ratio of carbon were further immersed into an electrolyte of 40 wt %-sulfuric acid solution for 24 hours so that the sheet-shaped electrode structures 3 of seven different types in weight ratio of carbon were permeated with the electrolyte. The two sets of the sheet-shaped electrode structures 3 of seven different types in weight ratio of carbon were picked up from the 40 wt %-sulfuric acid solution. A sheet-shaped separator 4 was prepared which comprises a porous membrane of a size of 70×50×0.02 mm. A gasket 5 made of a non-conductive butyl rubber was provided around the sheet-shaped separator 4. Namely, the sheet-shaped separator 4 was placed in an opening of the gasket 5, so that the sheet-shaped separator 4 was surrounded by the gasket 5. The two sheet-shaped electrode structures 3 of the same type were placed to sandwich the sheet-shaped separator 4 surrounded by the gasket 5. The two sheet-shaped electrode structures 3 of the same type are separated by the sheet-shaped separator 4 and the gasket 5, thereby forming a basic cell which comprises the two sheet-shaped electrode structures 3, the sheet-shaped separator 4 and the gasket 5. The cell was prepared in the same manner for every seven different types in weight ratio of carbon.

Each of the basic cells of seven different types in weight ratio of carbon was placed in a thermostat at 120° C. where a pressure of 5 kg/cm$^2$ was applied to peripheral regions of the two sheet-shaped electrode structures 3 toward the gasket 5, so that the peripheral regions of the two sheet-shaped electrode structures 3 were pressured to the gasket 5, whereby peripheral regions of the two sheet-shaped electrode structures 3 were cure-bonded with the gasket 5 and thus the electrolyte is sealed. Paired terminal plates 6 are fixed to outsides of the two sheet-shaped electrode structures 3 with applying a pressure of 100 kg/cm$^2$ to the two sheet-shaped electrode structures 3 toward the sheet-shaped separator 4. Four sets of a bolt 7 and a nut 8 were used to fix four corners of the paired terminal plates 6. Packings 9 made of non-conductive butyl rubber were used for electrical isolation between the paired terminal plates 6. The capacitor was prepared in the same manner for every seven different types in weight ratio of carbon.

EVALUATION 3

Figure 9:
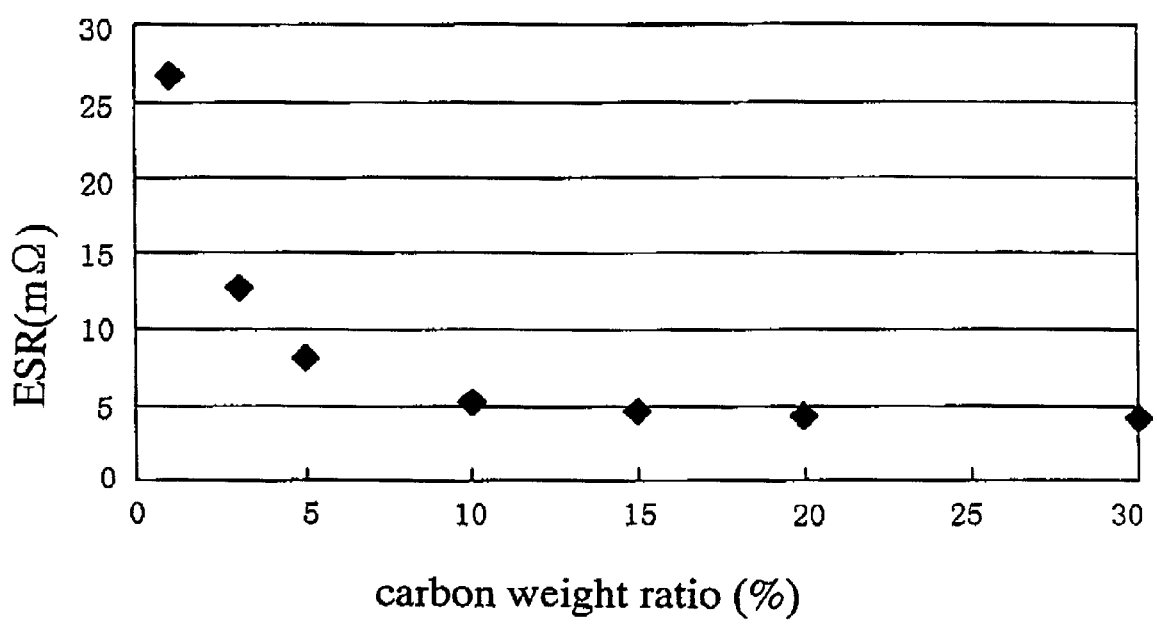
FIG. 9 is a diagram illustrative of variations of equivalent series resistance (ESR) of the electric double layer capacitors versus variation in weight ratio of carbon.

FIG. 9 is a diagram illustrative of variations of equivalent series resistance (ESR) of the electric double layer capacitors versus variation in weight ratio of carbon. As the weight ratio of carbon is increased from 1% to 5%, then the equivalent series resistance of the electric double-layer capacitor is rapidly decreased. As the weight ratio of carbon is increased from 5% to 30%, the equivalent series of the electric double layer capacitor is gradually decreased and remains low. As the weight ratio of carbon is in the range of 10–30%, then the equivalent series resistance of the electric double layer capacitor almost remains unchanged.

Figure 10:
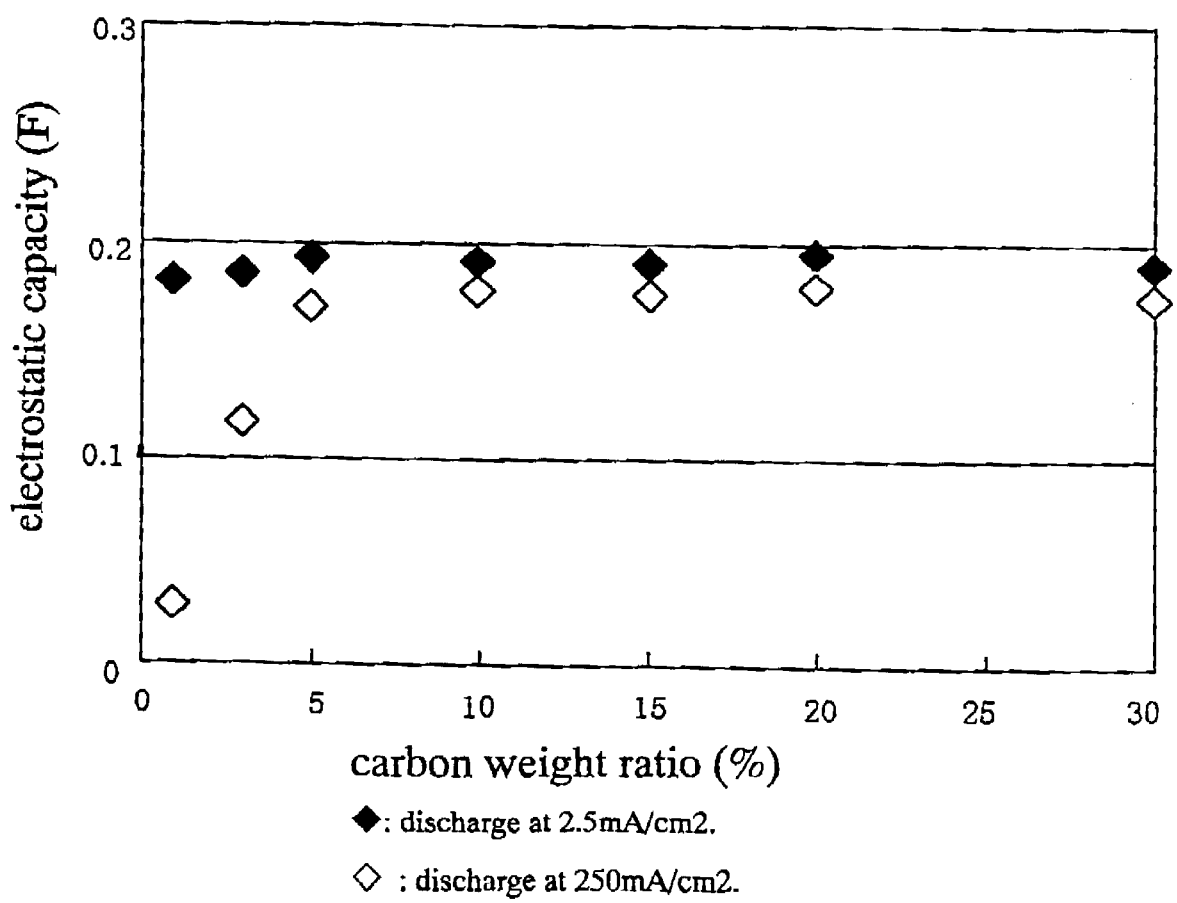
FIG. 10 is a diagram illustrative of variations of electrostatic capacity of the electric double layer capacitor versus variation in weight ratio of carbon in both cases of different discharge currents of 2.5 mA/cm2 and 250 mA/cm2.

FIG. 10 is a diagram illustrative of variations of electrostatic capacity of the electric double layer capacitor versus variation in weight ratio of carbon in both cases of different discharge currents of 2.5 mA/cm2 and 250 mA/cm2. ◆ represents the electrostatic capacity at 2.5 mA/cm2. ◇ represents the electrostatic capacity at 250 mA/cm2. In case of the discharge current of 2.5 mA/cm2, as the weight ratio of carbon is increased, the electrostatic capacity of the electric double layer capacitor almost remains unchanged. In case of the discharge current of 250 mA/cm2, as the weight ratio of carbon is increased from 1% and 5%, the electrostatic capacity of the electric double layer capacitor is rapidly increased. As the weight ratio of carbon is increased from 5% to 30%, the electrostatic capacity of the electric double layer capacitor almost remains unchanged. As the weight ratio of carbon is less than 5%, then a difference in electrostatic capacity of the electric double layer capacitor between the different discharge currents of 2.5 mA/cm2 and 250 mA/cm2 is large. As the weight ratio of carbon is not less than 5%, then a difference in electrostatic capacity of the electric double layer capacitor between the different discharge currents of 2.5 mA/cm2 and 250 mA/cm2 is small.

Figure 11:
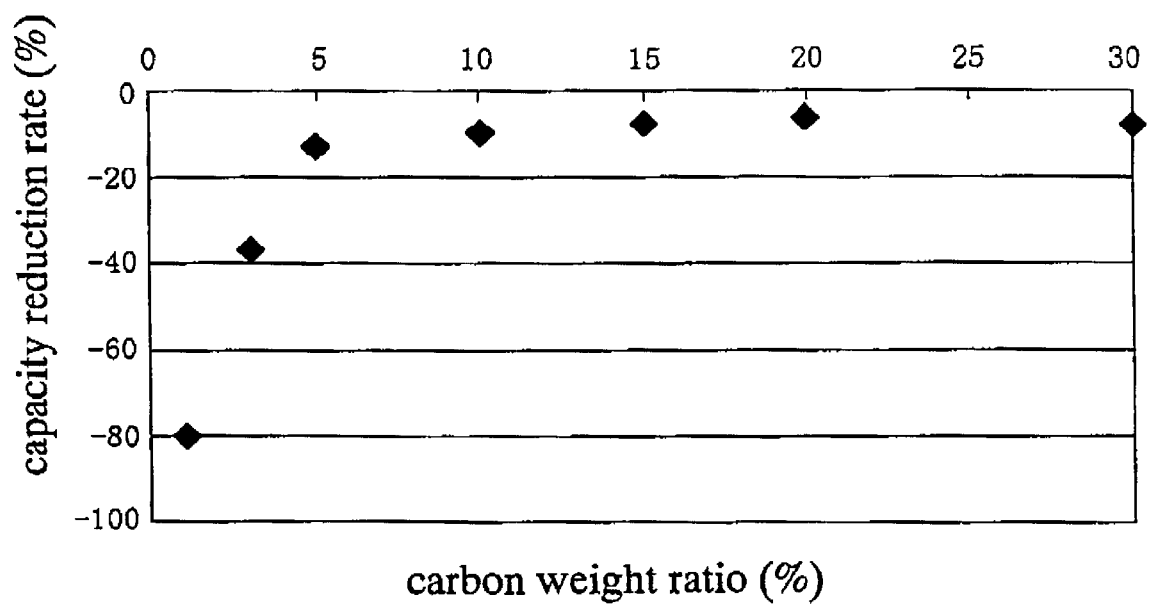
FIG. 11 is a diagram illustrative of variations of reduction rate of electrostatic capacity of the electric double layer capacitor by increasing discharge current of 2.5 mA/cm2 to higher discharge current of 250 mA/cm2 versus variation in weight ratio of carbon.

FIG. 11 is a diagram illustrative of variations of reduction rate of electrostatic capacity of the electric double layer capacitor by increasing discharge current of 2.5 mA/cm2 to higher discharge current of 250 mA/cm2 versus variation in weight ratio of carbon. As the weight ratio of carbon is decreased from 5%, then the reduction rate of electrostatic capacity of the electric double layer capacitor by increasing discharge current of 2.5 mA/cm2 to higher discharge current of 250 mA/cm2 is rapidly increased. As the weight ratio of carbon is in the range of 5% to 30%, then the reduction rate of electrostatic capacity of the electric double layer capacitor by increasing discharge current of 2.5 mA/cm2 to higher discharge current of 250 mA/cm2 almost remains unchanged to be low.

From FIGS. 9, 10 and 11, it is understood that the preferable range of the weight ratio of carbon is 5–30%.

Figure 12:
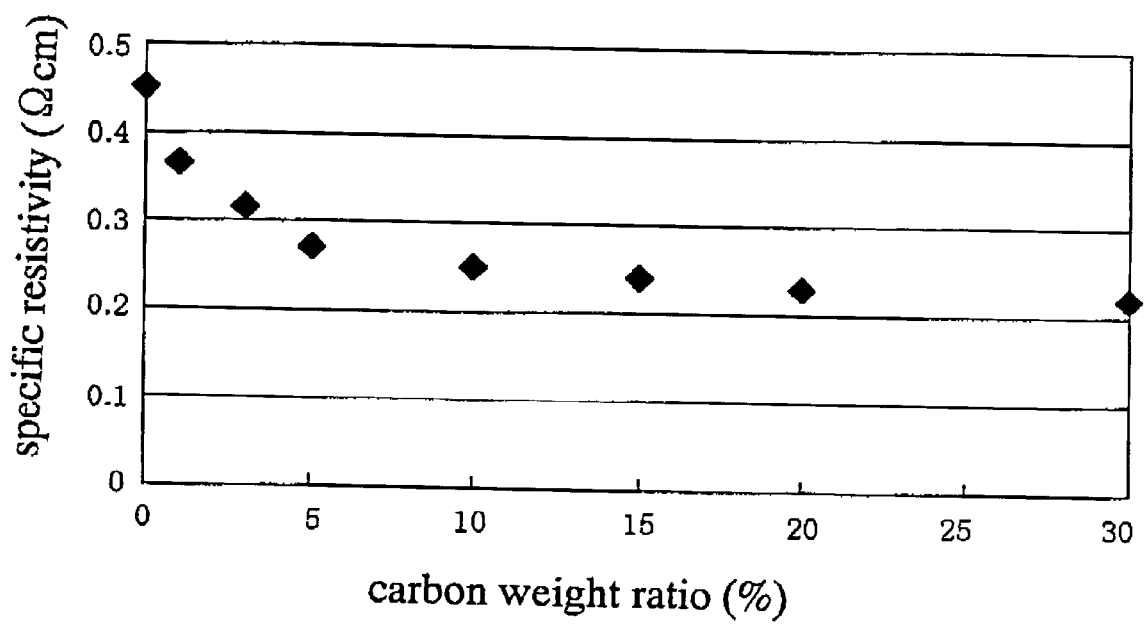
FIG. 12 is a diagram illustrative of variation in specific resistivity of the electric double layer capacitor versus variation in weight ratio of carbon.

FIG. 12 is a diagram illustrative of variation in specific resistivity of the electric double layer capacitor versus variation in weight ratio of carbon. As the weight ratio of carbon is increased from 0% to 5%, then the specific resistivity of the electric double layer capacitor is rapidly decreased. As the weight ratio of carbon is increased from 5% to 30%, the specific resistivity of the electric double layer capacitor is gradually decreased and remains lower than 0.3 ωcm. As the weight ratio of carbon is in the range of 5–30%, then the specific resistivity of the electric double layer capacitor almost remains unchanged.

The following table 2 shows steam transmittances of the unitary-formed electrode structure versus the weight ratio of carbon.

TABLE 2

| weight ratio of carbon (%) | steam transmittance (g/m²h) |
| --- | --- |
| 0 | 1.59 |
| 1 | 1.62 |
| 3 | 1.63 |
| 5 | 1.66 |
| 10 | 1.69 |
| 15 | 1.73 |
| 20 | 1.79 |
| 30 | 2.26 |
| Comp. Ex. 2 50%-carbon containing conductive butyl rubber | 2.86 |

As the weight ratio of carbon is not more than 20%, then the steam-transmittance remains lower than 2g/ m²h. A ventilation of the polarization electrode of the activated carbon powders is lower than the collector and further the polarization electrode of the activated carbon powders is in tightly contact with the collector. As the weight ratio of carbon is increased, then the steam-transmittance is simply increased. As the weight ratio of carbon is increased from 20% to 30%, then the steam-transmittance is largely increased.

EXAMPLE 7

A mixture of isobutylene/isoprene at 7:3 was prepared. Activated carbon powders, carbon and the isobutylene/isoprene mixture were mixed at a weight ratio of 40:10:50. This mixture was further mixed with a curing agent of powdered sulfur at 3% by weight and a curing promoter of zinc dimethylthiocarbamate at 2% by weight for polymerization to form a sheet with a size of 85×65×0.03 mm. In order to have activated carbon powders shown from surfaces of the sheet, both surfaces of the sheet were subjected to a plasma irradiation to form a sheet-shaped electrode structure 3 which serves as both the collector and the polarization electrode. This plasma irradiation was carried out under a pressure of 1 Torr, at a temperature of 45° C., with a power of 700W for 5 minutes. In the above manners, two sheet-shaped electrode structures 3 were prepared.

The two sheet-shaped electrode structures 3 were further immersed into an electrolyte of 40wt %-sulfuric acid solution for 24 hours so that the sheet-shaped electrode structures 3 were permeated with the electrolyte. The two sheet-shaped electrode structures 3 were picked up from the 40wt %-sulfuric acid solution. A sheet-shaped separator 4 was prepared which comprises a porous membrane of a size of 70×50×0.02 mm. A gasket 5 made of a non-conductive butyl rubber is provided around the sheet-shaped separator 4. Namely, the sheet-shaped separator 4 is placed in an opening of the gasket 5, so that the sheet-shaped separator 4 is surrounded by the gasket 5. The two sheet-shaped electrode structures 3 were placed to sandwich the sheet-shaped separator 4 surrounded by the gasket 5. The two sheet-shaped electrode structures 3 are separated by the sheet-shaped separator 4 and the gasket 5, thereby forming a basic cell which comprises the two sheet-shaped electrode structures 3, the sheet-shaped separator 4 and the gasket 5. In the same manner, twenty basic cells were prepared.

The twenty basic cells were laminated to form a cell lamination. The cell lamination was placed in a thermostat at 120° C. where a pressure of 5 kg/cm² was applied to peripheral regions of the sheet-shaped electrode structures 3 toward the gasket 5, so that the peripheral regions of the sheet-shaped electrode structures 3 were pressured to the gasket 5, whereby peripheral regions of the sheet-shaped electrode structures 3 were cure-bonded with the gasket 5 and thus the electrolyte was sealed. Paired terminal plates 6 are fixed to outsides of the most-outside sheet-shaped electrode structures 3 with applying a pressure of 100 kg/cm² to the sheet-shaped electrode structures 3 toward the sheet-shaped separators 4. Four sets of a bolt 7 and a nut 8 were used to fix four corners of the paired terminal plates 6. Packings 9 made of non-conductive butyl rubber were used for electrical isolation between the paired terminal plates 6.

Variations in equivalent series resistance (ESR) of the electric double layer capacitor over time were measured under conditions of application of 0.8V and at a temperature of 70° C. The samples were placed in the thermostat maintained at 70° C. and a direct current voltage of 0.8V was applied across the terminal plates 6. Sample 1 of the capacitor was picked up from the thermostat 0 hour after the voltage application for discontinuation of the voltage application and a short circuit was formed between the terminals. This sample was then cooled down to room temperature to measure the equivalent series resistance of this sample in the same manner as described above. Sample 2 of the capacitor was picked up from the thermostat 24 hours after the voltage application for discontinuation of the voltage application and a short circuit was formed between the terminals. This sample was then cooled down to room temperature to measure the equivalent series resistance of this sample in the same manner as described above. Sample 3 of the capacitor was picked up from the thermostat 120 hours after the voltage application for discontinuation of the voltage application and a short circuit was formed between the terminals. This sample was then cooled down to room temperature to measure the equivalent series resistance of this sample in the same manner as described above. Sample 4 of the capacitor was picked up from the thermostat 240 hours after the voltage application for discontinuation of the voltage application and a short circuit was formed between the terminals. This sample was then cooled down to room temperature to measure the equivalent series resistance of this sample in the same manner as described above. Sample 5 of the capacitor was picked up from the thermostat 500 hours after the voltage application for discontinuation of the voltage application and a short circuit was formed between the terminals. This sample was then cooled down to room temperature to measure the equivalent series resistance of this sample in the same manner as described above. Sample 6 of the capacitor was picked up from the thermostat 1000 hours after the voltage application for discontinuation of the voltage application and a short circuit was formed between the terminals. This sample was then cooled down to room temperature to measure the equivalent series resistance of this sample in the same manner as described above.

COMPARATIVE EXAMPLE 3

A polarization electrode and a collector were separately formed. The polarization electrode 10 were formed by mixing activated carbon powders and powdered phenol resin as binder at a weight 6:4 and subsequent formation of the mixture in a sheet prior to a heat treatment to the mixture at 900° C., in a nitrogen atmosphere. The collectors 11 were formed of a 50%-carbon containing butyl rubber. The two polarization electrodes 10 have a size 70×50×0.10 mm. The two collectors 11 have a size of 85×65×0.03 mm.

The polarization electrodes 10 were further immersed into an electrolyte of 40 wt %-sulfuric acid solution for 24 hours so that the two polarization electrodes 10 were permeated with the electrolyte. The two polarization electrodes 10 were picked up from the 40 wt %-sulfuric acid solution. A sheet-shaped separator 12 was prepared which comprises a porous membrane of a size of 70×50×0.02 mm. The two polarization electrodes 10 were placed to sandwich the sheet-shaped separator 12 to form a sandwiched structure comprising the sheet-shaped separator 12 and the polarization electrodes 10. A gasket 13 made of a non-conductive butyl rubber is provided around the sandwiched structure comprising the sheet-shaped separator 12 and the polarization electrodes 10. Namely, the sandwiched structure comprising the sheet-shaped separator 12 and the polarization electrodes 10 is placed in an opening of the gasket 13, so that the sandwiched structure is surrounded by the gasket 13. The two collectors 11 were placed to sandwich the sandwiched structure surrounded by the gasket 13. The two collectors 11 are separated by the sandwiched structure and the gasket 13, thereby forming a basic cell which comprises the two collectors 11, the two polarization electrodes 10, the sheet-shaped separator 12 and the gasket 13. Twenty of the basic cell were prepared in these manners. The twenty basic cells were laminated to form a cell lamination.

The twenty basic cells were laminated to form a cell lamination. The cell lamination was placed in a thermostat at 120° C. where a pressure of 5 kg/cm² was applied to peripheral regions of the sheet-shaped electrode structures 3 toward the gasket 5, so that the peripheral regions of the sheet-shaped electrode structures 3 were pressured to the gasket 5, whereby peripheral regions of the sheet-shaped electrode structures 3 were cure-bonded with the gasket 5 and thus the electrolyte was sealed. Paired terminal plates 6 are fixed to outsides of the most-outside sheet-shaped electrode structures 3 with applying a pressure of 100 kg/cm² to the sheet-shaped electrode structures 3 toward the sheet-shaped separators 4. Four sets of a bolt 7 and a nut 8 were used to fix four corners of the paired terminal plates 6. Packings 9 made of non-conductive butyl rubber were used for electrical isolation between the paired terminal plates 6.

Variations in equivalent series resistance (ESR) of the electric double layer capacitor over time were measured under conditions of application of 0.8V and at a temperature of 70° C. The samples were placed in the thermostat maintained at 70° C. and a direct current voltage of 0.8V was applied across the terminal plates 6. Sample 1 of the capacitor was picked up from the thermostat 0 hour after the voltage application for discontinuation of the voltage application and a short circuit was formed between the terminals. This sample was then cooled down to room temperature to measure the equivalent series resistance of this sample in the same manner as described above. Sample 2 of the capacitor was picked up from the thermostat 24 hours after the voltage application for discontinuation of the voltage application and a short circuit was formed between the terminals. This sample was then cooled down to room temperature to measure the equivalent series resistance of this sample in the same manner as described above. Sample 3 of the capacitor was picked up from the thermostat 120 hours after the voltage application for discontinuation of the voltage application and a short circuit was formed between the terminals. This sample was then cooled down to room temperature to measure the equivalent series resistance of this sample in the same manner as described above. Sample 4 of the capacitor was picked up from the thermostat 240 hours after the voltage application for discontinuation of the voltage application and a short circuit was formed between the terminals. This sample was then cooled down to room temperature to measure the equivalent series resistance of this sample in the same manner as described above. Sample 5 of the capacitor was picked up from the thermostat 500 hours after the voltage application for discontinuation of the voltage application and a short circuit was formed between the terminals. This sample was then cooled down to room temperature to measure the equivalent series resistance of this sample in the same manner as described above. Sample 6 of the capacitor was picked up from the thermostat 1000 hours after the voltage application for discontinuation of the voltage application and a short circuit was formed between the terminals. This sample was then cooled down to room temperature to measure the equivalent series resistance of this sample in the same manner as described above.

EVALUATION 4

Figure 13:
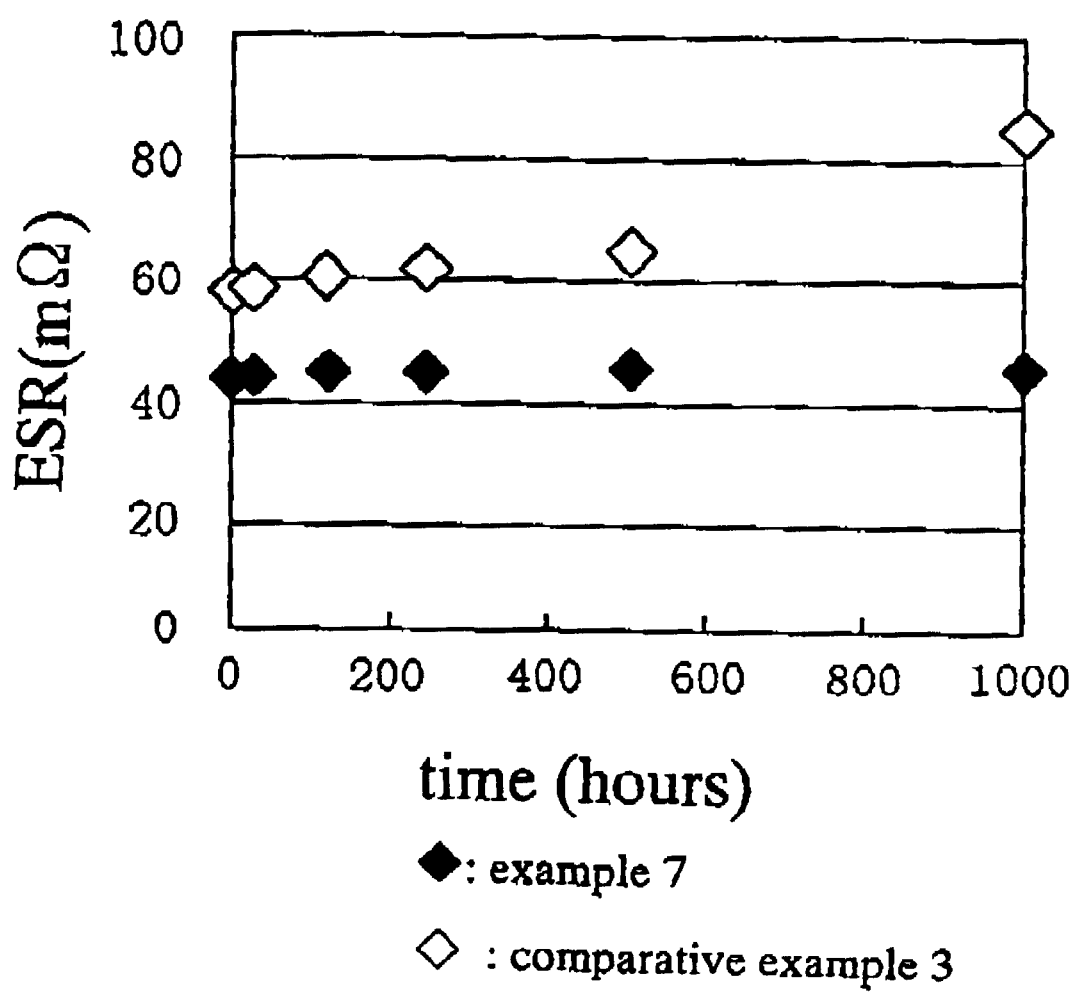
FIG. 13 is a diagram illustrative of variations in equivalent series resistance, over time, of the electric double layer capacitors having 20-cell lamination structures of example 7 and comparative example 3.

FIG. 13 is a diagram illustrative of variations in equivalent series resistance, over time, of the electric double layer capacitors having 20-cell lamination structures of example 7 and comparative example 3. ◆ represents variations in equivalent series resistance of the electric double layer capacitor of example 7. ◇ represents variations in equivalent series resistance of the electric double layer capacitor of comparative example 3. The electric double layer capacitor of example 7 shows almost no variation in equivalent series resistance over time. The electric double layer capacitor of comparator example 3 shows gradual increase in equivalent series resistance after the time has passed 240 hours. The electric double layer capacitor of example 7 remains lower in equivalent series resistance than the electric double layer capacitor of comparative example 3. The electric double layer capacitor of comparative example 3 generates a gas accumulated in a gap between the separately formed polarization electrode and collector, whereby the gas pressure causes the polarization electrode and collector to be peeled from each other, resulting in increase in the contact resistance between the polarization electrode and collector. This results in the increase in the equivalent series resistance. In the electric double layer capacitor of example 7, the polarization electrode of the activated carbon powders is in tightly contact with the collector, for which reason even if a gap is generated, then the polarization electrode of the activated carbon powders is not peeled from the collector, whereby the contact resistance between the polarization electrode and collector is not increased, resulting in no increase in the equivalent series resistance.

EXAMPLE 8

In place of a butyl rubber for the insulative base material of the collector, a polybutadiene rubber, a polyisoprene rubber, a butadiene styrene rubber (SBR), an ethylene propylene rubber (EPM), a chloroprene rubber, a nitrile rubber, an acrylic rubber, a silicone rubber, ethylene-α-olefin copolymer and propylene-α-olefin copolymer were used. Namely activated carbon powders, carbon and the above insulative material were mixed at a weight ratio of 40:10:50 to form ten kinds of the mixtures. These mixtures were further mixed with a curing agent of powdered sulfur at 3% by weight and a curing promoter of zinc dimethylthiocarbamate at 2% by weight for polymerization to form ten kinds of sheets with a size of 85×65×0.03 mm. In order to have activated carbon powders shown from surfaces of the sheet, both surfaces of the sheets were subjected to a plasma irradiation to form ten kinds of sheet-shaped electrode structures 3, each of which serves as both the collector and the polarization electrode. This plasma irradiation was carried out under a pressure of 1 Torr, at a temperature of 45° C., with a power of 700W for 5 minutes.

In order to form cells, the ten kinds of sheet-shaped electrode structures 3 were further immersed into an electrolyte of 40 wt %-sulfuric acid solution for 24 hours so that the sheet-shaped electrode structures 3 were permeated with the electrolyte. The ten kinds of sheet-shaped electrode structures 3 were picked up from the 40 wt %-sulfuric acid solution. A sheet-separator 4 was prepared which comprises a porous membrane of a size of 70×50×0.02 mm. A gasket 5 made of a non-conductive butyl rubber is provided around the sheet-shaped separator 4. Namely, the sheet-shaped separator 4 is placed in an opening of the gasket 5, so that the sheet-shaped separator 4 is surrounded by the gasket 5. The two sheet-shaped electrode structures 3 were placed to sandwich the sheet-shaped separator 4 surrounded by the gasket 5. The two sheet-shaped electrode structures 3 are separated by the sheet-shaped separator 4 and the gasket 5, thereby forming a basic cell which comprises the two sheet-shaped electrode structures 3, the sheet-shaped separator 4 and the gasket 5.

The basic cell was placed in a thermostat at 120° C. where a pressure of 5 kg/cm$^2$ was applied to peripheral regions of the two sheet-shaped electrode structures 3 toward the gasket 5, so that the peripheral regions of the two sheet-shaped electrode structures 3 were pressured to the gasket 5, whereby peripheral regions of the two sheet-shaped electrode structures 3 were cure-bonded with the gasket 5 and thus the electrolyte is sealed. Paired terminal plates 6 are fixed to outsides of the two sheet-shaped electrode structures 3 with applying a pressure of 100 kg/cm$^2$ to the two sheet-shaped electrode structures 3 toward the sheet-shaped separator 4. Four sets of a bolt 7 and a nut 8 were used to fix four corners of the paired terminal plates 6. Packings 9 made of non-conductive butyl rubber were used for electrical isolation between the paired terminal plates 6. The equivalent series resistance of the capacitors of different ten kinds were measured in the same manner as described above.

In order to measure ability of the ten kinds of sheet-shaped electrode structures 3 to the sulfuric acid, the ten kinds of sheet-shaped electrode structures 3 were further immersed into an electrolyte of 40 wt %-sulfuric acid solution at 85° C. for 70 hours so that variation in tensile stress, variation in elongation, variation in volume and variation in mass of each of the ten kinds of sheet-shaped electrode structures 3.

The following table 3 shows variation in tensile stress, variation in elongation, variation in volume and variation in mass as well as equivalent series resistance (ESR) of each of the eleven kinds of sheet-shaped electric structures.

TABLE 3

| Used polymer | tensile (%) | elongation (%) | volume (%) | mass (%) | ESR (mΩ) |
|---|---|---|---|---|---|
| butyl | +8 | −3 | 0 | −0.2 | 5.4 |
| polybutadiene | +2 | −2 | 0 | −0.1 | 5.5 |
| polyisoprene | +5 | −3 | −0.2 | +0.1 | 5.8 |
| butadiene styrene | +10 | −1 | 0 | −0.1 | 5.9 |
| ethylene propylene | −1 | 0 | +0.1 | +0.3 | 5.0 |
| chloroprene | −4 | −6 | −7.3 | −3.5 | |
| nitrile | −40 | −51 | −15 | −18 | |
| acrylic | −34 | −45 | −17 | −12 | |
| silicone | −53 | −94 | −51 | −38 | |
| ethylene-α-olefin | +4 | +1 | +0.2 | −0.2 | 4.4 |
| propylene-α-olefin | −3 | −4 | 0 | −0.1 | 4.2 |
| standard | ±15 | ±15 | ±2 | ±2 | |

From the table 3, it is understood that in cases of using the chloroprene rubber, the nitrile rubber, the acrylic rubber, the silicone rubber, the stability to the sulfuric acid is poor. In other cases of using the butyl rubber, the polybutadiene rubber, the polyisoprene rubber, the butadiene styrene rubber (SBR), the ethylene propylene rubber (EPM), the ethylene-α-olefin copolymer and the propylene-α-olefin copolymer, the stability to the sulfuric acid is sufficient and the equivalent series resistance is low. It is preferable to use, as the insulative base material, one of the butyl rubber, the polybutadiene rubber, the polyisoprene rubber, the butadiene styrene rubber (SBR), the ethylene propylene rubber (EPM), the ethylene-α-olefin copolymer and the propylene-α-olefin copolymer.

In the above examples, the coconut shell-derived activated carbon powders were selected. Other activated carbon powders are of course available. The activated carbon powders were selected to have a specific surface area of not less than 500 m2/g. The polypropylene non-woven fabric was used. Other pours membranes are also available which has non-conductivity and ion-permeability.

In accordance with the present invention, the polarization electrode material is mixed in the collector to form a unitary-formed electrode structure serving both as the polarization electrode and the collector, whereby the contact resistance between the polarization electrode and the collector is reduced, and also variation in internal resistance due to variation of applied pressure to the opposite sides of the cell is suppressed. The insulative basic material is selected to have a softness or an elasticity, so that the unitary-formed electrode structure is rich in flexiblity for facilitating an adhesion with the gasket. This improves the productivity of the electric double layer capacitor. The unitary-formed electrode structure further reduces the thickness of the cell of the capacitor, for example, in the 10 micrometers order. This allows size-reduction of the capacitor. Particularly, the unitary-formed electrode structure is effective to reduce the thickness or reduce the size of the electric double layer capacitor having the cell lamination structure. Further, since the polarization electrode material is mixed in the collector to form the unitary-formed electrode structure serving both as the polarization electrode and the collector, then the polarization electrode is free from the problem in peel from the collector. This makes the capacitor free from any increase in internal resistance and improves the durability of the capacitor. The unitary-formed electrode structure allows the electric double layer capacitor to have high reliability.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A unitary collector and polarization electrode for a double-layer capacitor, the unitary electrode comprising:
   an electrically conductive base serving as the collector, said base having a first electrical contact surface and a second electrical contact surface opposite said first electrical contact surface; and
   a multiplicity of separate polarization particles dispersed throughout said base and serving as the polarization electrode, a plurality of said polarization particles being exposed on at least one of said first and second electrical contact surfaces.

2. The unitary electrode of claim 1, wherein said base comprises an insulative material selected from the group of insulators consisting of a butyl rubber, a polybutadiene rubber, a polyisoprene rubber, a butadiene styrene rubber (SBR), an ethylene propylene rubber (EPM), ethylene-α-olefin copolymer and propylene-α-olefin copolymer.

3. The unitary electrode of claim 1, wherein said polarization particles comprise a conductive powder that is 30 to 80% of a total weight of said base and said particles.

4. The unitary electrode of claim 3, wherein said conductive powder is 40 to 70% of the total weight of said base and said particles.

5. The unitary electrode of claim 1, wherein said base comprises an insulator mixed with a conductive material.

6. The unitary electrode of claim 5, wherein said insulator is sheet-shaped.

7. The unitary electrode of claim 5, wherein said conductive material is 5 to 30% of a total weight of said base and said particles.

8. The unitary electrode of claim 1, wherein the plurality of said polarization particles is exposed on said first contact surface.

9. The unitary electrode of claim 1, wherein the plurality of said polarization is exposed on said second contact surface.

10. The unitary electrode of claim 1, wherein the plurality of said polarization particles is exposed on both said first and second contact surface.

11. The double-layer capacitor comprising:
    a pair of unitary electrodes with a separator between said pair of unitary electrodes; and
    two terminal plates that sandwich said pair of unitary electrodes,
    each of said unitary electrodes comprising an electrically conductive base serving as a collector of the double-layer capacitor, said base having a first surface contacting said separator and a second surface opposite said first surface that contacts a respective one of said two terminal plates, and a multiplicity of separate polarization particles dispersed throughout said base and serving as a polarization electrode of the double-layer capacitor, a plurality of said polarization particles being exposed on at least one of said first and second contact surfaces.

12. The double-layer capacitor of claim 11, wherein said base comprises an insulative material selected from the group of insulators of a butyl rubber, a polybutadiene rubber, a polyisoprene rubber, a butadiene styrene rubber, an ethylene propylene rubber (EPM), ethylene-α-olefin copolymer and propylene-α-olefin copolymer.

13. The double-layer capacitor of claim 11, further comprising a gasket between said pair of unitary electrodes and around said separator.

14. The double-layer capacitor of claim 11, wherein a plurality of said polarization particles is exposed on said first contact surface.

15. The double-layer capacitor of claim 11, wherein a plurality of said polarization particles is exposed on said second contact surface.

16. The double-layer capacitor of claim 11, wherein a plurality of said polarization particles is exposed on both the first and second contact surface.

17. The double-layer capacitor of claim 11, wherein said polarization particles comprise a conductive powder that is 30 to 80% of a total weight of said base and said particles.

18. The double-layer capacitor of claim 17, wherein said conductive powder is 40 to 70% of the total weight of said base and said particles.

19. The double-layer capacitor of claim 11, wherein said base comprises an insulator mixed with a conductive material.

20. The double-layer capacitor of claim 19, wherein said insulator is sheet-shaped.

21. The double-layer capacitor of claim 19, wherein said conductive material is 5 to 30% of a total weight of said base and said particles.

* * * * *